(12) United States Patent
Chatwani et al.

(10) Patent No.: US 9,461,840 B2
(45) Date of Patent: Oct. 4, 2016

(54) PORT PROFILE MANAGEMENT FOR VIRTUAL CLUSTER SWITCHING

(75) Inventors: Dilip Chatwani, San Jose, CA (US); Suresh Vobbilisetty, San Jose, CA (US); Phanidhar Koganti, Sunnyvale, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 260 days.

(21) Appl. No.: 13/042,259

(22) Filed: Mar. 7, 2011

(65) Prior Publication Data

US 2011/0299413 A1 Dec. 8, 2011

Related U.S. Application Data

(60) Provisional application No. 61/350,838, filed on Jun. 2, 2010.

(51) Int. Cl.
*H04L 12/46* (2006.01)
*H04L 12/935* (2013.01)
*H04L 12/931* (2013.01)

(52) U.S. Cl.
CPC ....... *H04L 12/4625* (2013.01); *H04L 12/4641* (2013.01); *H04L 49/30* (2013.01); *H04L 49/65* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 5,390,173 A | 2/1995 | Spinney | |
| 5,802,278 A | 9/1998 | Isfeld | |
| 5,878,232 A | 3/1999 | Marimuthu | |
| 5,959,968 A | 9/1999 | Chin | |
| 5,973,278 A | 10/1999 | Wehrli, III | |
| 5,983,278 A | 11/1999 | Chong | |
| 6,041,042 A | 3/2000 | Bussiere | |
| 6,085,238 A | 7/2000 | Yuasa | |
| 6,104,696 A | 8/2000 | Kadambi | |
| 6,185,214 B1 * | 2/2001 | Schwartz et al. | 370/401 |
| 6,185,241 B1 | 2/2001 | Sun | |
| 6,438,106 B1 | 8/2002 | Pillar | |
| 6,498,781 B1 | 12/2002 | Bass | |
| 6,542,266 B1 * | 4/2003 | Phillips et al. | 398/54 |

(Continued)

FOREIGN PATENT DOCUMENTS

| | | |
|---|---|---|
| CN | 102801599 A | 11/2012 |
| EP | 0579567 | 5/1993 |

(Continued)

OTHER PUBLICATIONS

"Switched Virtual Internetworking moved beyond bridges and routers", 8178 Data Communications 23(Sep. 1994), No. 12, New York.

(Continued)

*Primary Examiner* — Bunjob Jaroenchonwanit
(74) *Attorney, Agent, or Firm* — Shun Yao; Park, Vaughan, Fleming & Dowler LLP

(57) ABSTRACT

One embodiment of the present invention provides a switch system. The switch includes a port profile which specifies a set of port configuration information. During operation, a control mechanism within the switch detects a source MAC address of an incoming frame and determines that the MAC address is associated with the port profile. The control mechanism then applies the port profile to a switch port on which the frame is received.

20 Claims, 16 Drawing Sheets

(56) References Cited

U.S. PATENT DOCUMENTS

| | | |
|---|---|---|
| 6,633,761 B1 | 10/2003 | Singhal |
| 6,771,610 B1 | 8/2004 | Seaman |
| 6,873,602 B1* | 3/2005 | Ambe .......................... 370/254 |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,173,934 B2 | 2/2007 | Lapuh |
| 7,197,308 B2 | 3/2007 | Singhal |
| 7,197,564 B1 | 3/2007 | Singhal |
| 7,206,288 B2 | 4/2007 | Cometto |
| 7,310,664 B1* | 12/2007 | Merchant et al. ............. 709/220 |
| 7,313,637 B2* | 12/2007 | Tanaka et al. .................... 710/8 |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1* | 5/2008 | Riggins et al. .................... 710/8 |
| 7,397,794 B1* | 7/2008 | Lacroute et al. ............. 370/367 |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2* | 11/2010 | Hara et al. .................... 714/5.11 |
| 7,843,906 B1 | 11/2010 | Chidambaram et al. |
| 7,843,907 B1* | 11/2010 | Abou-Emara et al. ....... 370/386 |
| 7,860,097 B1* | 12/2010 | Lovett et al. ................ 370/392 |
| 7,898,959 B1 | 3/2011 | Arad |
| 7,924,837 B1 | 4/2011 | Shabtay |
| 7,937,756 B2 | 5/2011 | Kay |
| 7,945,941 B2* | 5/2011 | Sinha et al. ........................ 726/1 |
| 7,949,638 B1* | 5/2011 | Goodson et al. ............. 707/655 |
| 7,957,386 B1 | 6/2011 | Aggarwal |
| 8,018,938 B1 | 9/2011 | Fromm |
| 8,027,354 B1* | 9/2011 | Portolani et al. ............. 370/431 |
| 8,054,832 B1* | 11/2011 | Shukla et al. ................ 370/389 |
| 8,068,442 B1 | 11/2011 | Kompella |
| 8,078,704 B2 | 12/2011 | Lee |
| 8,095,774 B1 | 1/2012 | Hughes et al. |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2* | 3/2012 | Elangovan et al. ....... 370/230.1 |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1* | 6/2012 | Pagel et al. .................... 370/393 |
| 8,195,774 B2* | 6/2012 | Lambeth et al. ............. 709/220 |
| 8,204,061 B1 | 6/2012 | Sane |
| 8,213,313 B1 | 7/2012 | Doiron |
| 8,213,336 B2* | 7/2012 | Smith et al. .................... 370/254 |
| 8,230,069 B2* | 7/2012 | Korupolu ...................... 709/226 |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Ramanathan |
| 8,301,686 B1* | 10/2012 | Appajodu et al. ............. 709/201 |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | J ha |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,806,031 B1 | 8/2014 | Kondur |
| 8,826,385 B2 | 9/2014 | Congdon |
| 8,937,865 B1 | 1/2015 | Kumar |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1* | 7/2002 | Yip .............................. 709/218 |
| 2003/0041085 A1* | 2/2003 | Sato ............................. 709/100 |
| 2003/0123393 A1 | 7/2003 | Feuerstraeter |
| 2003/0174706 A1 | 9/2003 | Shankar |
| 2003/0189905 A1* | 10/2003 | Lee ............................... 370/254 |
| 2003/0216143 A1 | 11/2003 | Roese |
| 2004/0001433 A1 | 1/2004 | Gram |
| 2004/0010600 A1 | 1/2004 | Baldwin |
| 2004/0049699 A1 | 3/2004 | Griffith |
| 2004/0117508 A1 | 6/2004 | Shimizu |
| 2004/0120326 A1* | 6/2004 | Yoon et al. ............. 370/395.53 |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0213232 A1 | 10/2004 | Regan |
| 2005/0007951 A1 | 1/2005 | Lapuh |
| 2005/0044199 A1* | 2/2005 | Shiga et al. ................... 709/223 |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0213561 A1 | 9/2005 | Yao |
| 2005/0220096 A1 | 10/2005 | Friskney |
| 2005/0265356 A1* | 12/2005 | Kawarai et al. ......... 370/395.53 |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0034292 A1 | 2/2006 | Wakayama |
| 2006/0059163 A1 | 3/2006 | Frattura |
| 2006/0062187 A1* | 3/2006 | Rune ............................... 370/338 |
| 2006/0072550 A1 | 4/2006 | Davis |
| 2006/0083254 A1* | 4/2006 | Ge et al. ........................ 370/401 |
| 2006/0098589 A1 | 5/2006 | Kreeger |
| 2006/0168109 A1 | 7/2006 | Warmenhoven |
| 2006/0184937 A1* | 8/2006 | Abels et al. ....................... 718/1 |
| 2006/0221960 A1 | 10/2006 | Borgione |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1* | 11/2006 | Shiga et al. ................... 709/238 |
| 2006/0285499 A1 | 12/2006 | Tzeng |
| 2006/0291388 A1 | 12/2006 | Amdahl et al. |
| 2007/0036178 A1 | 2/2007 | Hares |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |

(56) References Cited

U.S. PATENT DOCUMENTS

| Publication No. | Date | Name | Ref |
|---|---|---|---|
| 2007/0156659 A1 | 7/2007 | Lim | |
| 2007/0177525 A1 | 8/2007 | Wijnands | |
| 2007/0177597 A1 | 8/2007 | Ju | |
| 2007/0183313 A1 | 8/2007 | Narayanan | |
| 2007/0211712 A1 | 9/2007 | Fitch | |
| 2007/0274234 A1* | 11/2007 | Kubota | 370/254 |
| 2007/0289017 A1 | 12/2007 | Copeland, III | |
| 2008/0052487 A1* | 2/2008 | Akahane et al. | 711/207 |
| 2008/0065760 A1 | 3/2008 | Damm | |
| 2008/0072280 A1* | 3/2008 | Tardo et al. | 726/1 |
| 2008/0080517 A1 | 4/2008 | Roy | |
| 2008/0101386 A1 | 5/2008 | Gray | |
| 2008/0112400 A1 | 5/2008 | Dunbar et al. | |
| 2008/0133760 A1 | 6/2008 | Berkvens et al. | |
| 2008/0159277 A1 | 7/2008 | Vobbilisetty | |
| 2008/0172492 A1* | 7/2008 | Raghunath et al. | 709/229 |
| 2008/0181196 A1 | 7/2008 | Regan | |
| 2008/0181243 A1 | 7/2008 | Vobbilisetty | |
| 2008/0186981 A1 | 8/2008 | Seto | |
| 2008/0205377 A1* | 8/2008 | Chao et al. | 370/351 |
| 2008/0219172 A1 | 9/2008 | Mohan | |
| 2008/0225852 A1 | 9/2008 | Raszuk | |
| 2008/0225853 A1 | 9/2008 | Melman | |
| 2008/0228897 A1 | 9/2008 | Ko | |
| 2008/0240129 A1 | 10/2008 | Elmeleegy | |
| 2008/0267179 A1 | 10/2008 | LaVigne | |
| 2008/0285458 A1 | 11/2008 | Lysne | |
| 2008/0285555 A1 | 11/2008 | Ogasahara | |
| 2008/0298248 A1 | 12/2008 | Roeck | |
| 2008/0310342 A1 | 12/2008 | Kruys | |
| 2009/0022069 A1 | 1/2009 | Khan | |
| 2009/0037607 A1 | 2/2009 | Farinacci | |
| 2009/0042270 A1 | 2/2009 | Dolly | |
| 2009/0044270 A1 | 2/2009 | Shelly | |
| 2009/0067422 A1 | 3/2009 | Poppe | |
| 2009/0067442 A1* | 3/2009 | Killian | 370/401 |
| 2009/0079560 A1 | 3/2009 | Fries | |
| 2009/0080345 A1 | 3/2009 | Gray | |
| 2009/0083445 A1* | 3/2009 | Ganga | 709/250 |
| 2009/0092042 A1 | 4/2009 | Yuhara | |
| 2009/0092043 A1* | 4/2009 | Lapuh et al. | 370/228 |
| 2009/0106405 A1* | 4/2009 | Mazarick et al. | 709/222 |
| 2009/0116381 A1 | 5/2009 | Kanda | |
| 2009/0129384 A1 | 5/2009 | Regan | |
| 2009/0138577 A1 | 5/2009 | Casado | |
| 2009/0138752 A1 | 5/2009 | Graham | |
| 2009/0161584 A1 | 6/2009 | Guan | |
| 2009/0161670 A1 | 6/2009 | Shepherd | |
| 2009/0168647 A1 | 7/2009 | Holness | |
| 2009/0199177 A1* | 8/2009 | Edwards et al. | 718/1 |
| 2009/0204965 A1* | 8/2009 | Tanaka et al. | 718/1 |
| 2009/0213783 A1 | 8/2009 | Moreton | |
| 2009/0222879 A1 | 9/2009 | Kostal | |
| 2009/0245137 A1 | 10/2009 | Hares | |
| 2009/0245242 A1 | 10/2009 | Carlson | |
| 2009/0246137 A1 | 10/2009 | Hadida | |
| 2009/0252049 A1 | 10/2009 | Ludwig | |
| 2009/0252061 A1 | 10/2009 | Small | |
| 2009/0260083 A1* | 10/2009 | Szeto et al. | 726/22 |
| 2009/0279558 A1 | 11/2009 | Davis | |
| 2009/0292858 A1 | 11/2009 | Lambeth | |
| 2009/0316721 A1 | 12/2009 | Kanda | |
| 2009/0323708 A1 | 12/2009 | Ihle | |
| 2009/0327392 A1* | 12/2009 | Tripathi et al. | 709/201 |
| 2009/0327462 A1* | 12/2009 | Adams et al. | 709/222 |
| 2010/0027420 A1 | 2/2010 | Smith | |
| 2010/0054260 A1 | 3/2010 | Pandey | |
| 2010/0061269 A1 | 3/2010 | Banerjee | |
| 2010/0074175 A1* | 3/2010 | Banks et al. | 370/328 |
| 2010/0097941 A1 | 4/2010 | Carlson | |
| 2010/0103813 A1 | 4/2010 | Allan | |
| 2010/0103939 A1 | 4/2010 | Carlson | |
| 2010/0131636 A1* | 5/2010 | Suri et al. | 709/224 |
| 2010/0158024 A1 | 6/2010 | Sajassi | |
| 2010/0165877 A1* | 7/2010 | Shukla et al. | 370/254 |
| 2010/0165995 A1 | 7/2010 | Mehta | |
| 2010/0168467 A1 | 7/2010 | Johnston | |
| 2010/0169467 A1* | 7/2010 | Shukla et al. | 709/220 |
| 2010/0169948 A1 | 7/2010 | Budko | |
| 2010/0182920 A1 | 7/2010 | Matsuoka | |
| 2010/0215049 A1 | 8/2010 | Raza | |
| 2010/0220724 A1 | 9/2010 | Rabie | |
| 2010/0226368 A1 | 9/2010 | Mack-Crane | |
| 2010/0226381 A1 | 9/2010 | Mehta | |
| 2010/0246388 A1 | 9/2010 | Gupta | |
| 2010/0257263 A1 | 10/2010 | Casado | |
| 2010/0271960 A1 | 10/2010 | Krygowski | |
| 2010/0272107 A1 | 10/2010 | Papp | |
| 2010/0281106 A1 | 11/2010 | Ashwood-Smith | |
| 2010/0284414 A1 | 11/2010 | Gray | |
| 2010/0284418 A1 | 11/2010 | Gray | |
| 2010/0287262 A1* | 11/2010 | Elzur | 709/220 |
| 2010/0287548 A1* | 11/2010 | Zhou et al. | 718/1 |
| 2010/0290473 A1* | 11/2010 | Enduri et al. | 370/395.53 |
| 2010/0299527 A1 | 11/2010 | Arunan | |
| 2010/0303071 A1 | 12/2010 | Kotalwar | |
| 2010/0303075 A1 | 12/2010 | Tripathi | |
| 2010/0303083 A1 | 12/2010 | Belanger | |
| 2010/0309820 A1 | 12/2010 | Rajagopalan | |
| 2010/0309912 A1 | 12/2010 | Mehta | |
| 2010/0329110 A1 | 12/2010 | Rose | |
| 2011/0019678 A1 | 1/2011 | Mehta | |
| 2011/0032945 A1 | 2/2011 | Mullooly | |
| 2011/0035489 A1 | 2/2011 | McDaniel | |
| 2011/0035498 A1* | 2/2011 | Shah et al. | 709/226 |
| 2011/0044339 A1 | 2/2011 | Kotalwar | |
| 2011/0044352 A1 | 2/2011 | Chaitou | |
| 2011/0055274 A1 | 3/2011 | Scales | |
| 2011/0064086 A1 | 3/2011 | Xiong | |
| 2011/0064089 A1 | 3/2011 | Hidaka | |
| 2011/0072208 A1 | 3/2011 | Gulati | |
| 2011/0085560 A1* | 4/2011 | Chawla et al. | 370/401 |
| 2011/0085563 A1* | 4/2011 | Kotha et al. | 370/401 |
| 2011/0110266 A1 | 5/2011 | Li | |
| 2011/0134802 A1 | 6/2011 | Rajagopalan | |
| 2011/0134803 A1 | 6/2011 | Dalvi | |
| 2011/0134925 A1 | 6/2011 | Safrai | |
| 2011/0142053 A1* | 6/2011 | Van Der Merwe et al. | 370/395.1 |
| 2011/0142062 A1 | 6/2011 | Wang | |
| 2011/0161494 A1 | 6/2011 | McDysan | |
| 2011/0161695 A1* | 6/2011 | Okita et al. | 713/310 |
| 2011/0188373 A1 | 8/2011 | Saito | |
| 2011/0194403 A1 | 8/2011 | Sajassi | |
| 2011/0194563 A1 | 8/2011 | Shen | |
| 2011/0228780 A1 | 9/2011 | Ashwood-Smith | |
| 2011/0231574 A1* | 9/2011 | Saunderson et al. | 709/245 |
| 2011/0235523 A1 | 9/2011 | Jha | |
| 2011/0243133 A9* | 10/2011 | Villait et al. | 370/392 |
| 2011/0243136 A1 | 10/2011 | Raman | |
| 2011/0246669 A1* | 10/2011 | Kanada et al. | 709/238 |
| 2011/0255538 A1* | 10/2011 | Srinivasan et al. | 370/392 |
| 2011/0255540 A1 | 10/2011 | Mizrahi | |
| 2011/0261828 A1 | 10/2011 | Smith | |
| 2011/0268120 A1 | 11/2011 | Vobbilisetty | |
| 2011/0268125 A1 | 11/2011 | Vobbilisetty | |
| 2011/0274114 A1 | 11/2011 | Dhar | |
| 2011/0280572 A1 | 11/2011 | Vobbilisetty | |
| 2011/0286457 A1 | 11/2011 | Ee | |
| 2011/0296052 A1 | 12/2011 | Guo | |
| 2011/0299391 A1 | 12/2011 | Vobbilisetty | |
| 2011/0299413 A1 | 12/2011 | Chatwani | |
| 2011/0299414 A1 | 12/2011 | Yu | |
| 2011/0299527 A1 | 12/2011 | Yu | |
| 2011/0299528 A1 | 12/2011 | Yu | |
| 2011/0299531 A1 | 12/2011 | Yu | |
| 2011/0299532 A1 | 12/2011 | Yu | |
| 2011/0299533 A1 | 12/2011 | Yu | |
| 2011/0299534 A1 | 12/2011 | Koganti | |
| 2011/0299535 A1 | 12/2011 | Vobbilisetty | |
| 2011/0299536 A1 | 12/2011 | Cheng | |
| 2011/0317559 A1 | 12/2011 | Kern | |
| 2011/0317703 A1 | 12/2011 | Dunbar et al. | |
| 2012/0011240 A1* | 1/2012 | Hara et al. | 709/223 |

(56) References Cited

U.S. PATENT DOCUMENTS

| | | | |
|---|---|---|---|
| 2012/0014261 A1 | 1/2012 | Salam | |
| 2012/0014387 A1 | 1/2012 | Dunbar | |
| 2012/0027017 A1 | 2/2012 | Rai | |
| 2012/0033663 A1 | 2/2012 | Guichard | |
| 2012/0033665 A1 | 2/2012 | Jacob Da Silva | |
| 2012/0033669 A1 | 2/2012 | Mohandas | |
| 2012/0075991 A1 | 3/2012 | Sugita | |
| 2012/0099602 A1 | 4/2012 | Nagapudi | |
| 2012/0106339 A1 | 5/2012 | Mishra | |
| 2012/0131097 A1* | 5/2012 | Baykal et al. | 709/203 |
| 2012/0131289 A1 | 5/2012 | Taguchi | |
| 2012/0147740 A1 | 6/2012 | Nakash | |
| 2012/0158997 A1 | 6/2012 | Hsu | |
| 2012/0163164 A1 | 6/2012 | Terry | |
| 2012/0177039 A1 | 7/2012 | Berman | |
| 2012/0243539 A1 | 9/2012 | Keesara | |
| 2012/0275347 A1 | 11/2012 | Banerjee | |
| 2012/0294192 A1 | 11/2012 | Masood | |
| 2012/0294194 A1 | 11/2012 | Balasubramanian | |
| 2012/0320800 A1 | 12/2012 | Kamble | |
| 2012/0320926 A1 | 12/2012 | Kamath et al. | |
| 2012/0327766 A1 | 12/2012 | Tsai | |
| 2012/0327937 A1 | 12/2012 | Melman et al. | |
| 2013/0003535 A1 | 1/2013 | Sarwar | |
| 2013/0003737 A1 | 1/2013 | Sinicrope | |
| 2013/0003738 A1 | 1/2013 | Koganti | |
| 2013/0028072 A1 | 1/2013 | Addanki | |
| 2013/0034015 A1 | 2/2013 | Jaiswal | |
| 2013/0067466 A1 | 3/2013 | Combs | |
| 2013/0070762 A1 | 3/2013 | Adams | |
| 2013/0114595 A1 | 5/2013 | Mack-Crane | |
| 2013/0127848 A1 | 5/2013 | Joshi | |
| 2013/0194914 A1 | 8/2013 | Agarwal | |
| 2013/0219473 A1 | 8/2013 | Schaefer | |
| 2013/0250951 A1 | 9/2013 | Koganti | |
| 2013/0259037 A1 | 10/2013 | Natarajan et al. | |
| 2013/0272135 A1 | 10/2013 | Leong | |
| 2011/3312903 | 11/2013 | Radhakrishnan | |
| 2013/0301642 A1 | 11/2013 | Radhakrishnan | |
| 2014/0044126 A1 | 2/2014 | Sabhanatarajan | |
| 2014/0105034 A1 | 4/2014 | Sun | |

FOREIGN PATENT DOCUMENTS

| | | |
|---|---|---|
| EP | 1398920 A2 | 3/2004 |
| EP | 1916807 A2 | 4/2008 |
| EP | 2001167 A1 | 12/2008 |
| WO | 2008056838 | 5/2008 |
| WO | 2010111142 A1 | 9/2010 |
| WO | 2014031781 | 2/2014 |

OTHER PUBLICATIONS

S. Night et al., "Virtual Router Redundancy Protocol", Network Working Group, XP-002135272, Apr. 1998.
Eastlake 3rd., Donald et al., "RBridges: TRILL Header Options", Draft-ietf-trill-rbridge-options-00.txt, Dec. 24, 2009.
J. Touch, et al., "Transparent Interconnection of Lots of Links (TRILL): Problem and Applicability Statement", May 2009.
Perlman, Radia et al., "RBridge VLAN Mapping", Draft-ietf-trill-rbridge-vlan-mapping-01.txt, Dec. 4, 2009.
Perlman, Radia "Challenges and Opportunities in the Design of TRILL: a Routed layer 2 Technology", XP-002649647, 2009.
Nadas, S. et al., "Virtual Router Redundancy Protocol (VRRP) Version 3 for IPv4 and IPv6", Mar. 2010.
Perlman, Radia et al., "RBridges: Base Protocol Specification", draft-ietf-trill-rbridge-protocol-16.txt, Mar. 3, 2010.
Christensen, M. et al., "Considerations for Internet Group Management Protocol (IGMP) and Multicast Listener Discovery (MLD) Snooping Switches", May 2006.
Lapuh, Roger et al., "Split Multi-link Trunking (SMLT)", Oct. 2002.
Lapuh, Roger et al., "Split Multi-link Trunking (SMLT) draft-lapuh-network-smlt-08", 2008.

Office Action dated Oct. 2, 2013 for U.S. Appl. No. 13/044,326.
U.S. Appl. No. 12/312,903 Office Action dated Jun. 13, 2013.
U.S. Appl. No. 13/365,808 Office Action dated Jul. 18, 2013.
U.S. Appl. No. 13/365,993 Office Action dated Jul. 23, 2013.
U.S. Appl. No. 13/092,873 Office Action dated Jun. 19, 2013.
U.S. Appl. No. 13/184,526 Office Action dated May 22, 2013.
U.S. Appl. No. 13/184,526 Office Action dated Jan. 28, 2013.
U.S. Appl. No. 13/050,102 Office Action dated May 16, 2013.
U.S. Appl. No. 13/050,102 Office Action dated Oct. 26, 2012.
U.S. Appl. No. 13/044,301 Office Action dated Feb. 22, 2013.
U.S. Appl. No. 13/044,301 Office Action dated Jun. 11, 2013.
U.S. Appl. No. 13/030,688 Office Action dated Apr. 25, 2013.
U.S. Appl. No. 13/030,806 Office Action dated Dec. 3, 2012.
U.S. Appl. No. 13/030,806 Office Action dated Jun. 11, 2013.
U.S. Appl. No. 13/098,360 Office Action dated May 31, 2013.
U.S. Appl. No. 13/092,864 Office Action dated Sep. 19, 2012.
U.S. Appl. No. 12/950,968 Office Action dated Jun. 7, 2012.
U.S. Appl. No. 12/950,968 Office Action dated Jan. 4, 2013.
U.S. Appl. No. 13/092,877 Office Action dated Mar. 4, 2013.
U.S. Appl. No. 12/950,974 Office Action dated Dec. 20, 2012.
U.S. Appl. No. 12/950,974 Office Action dated May 24, 2012.
U.S. Appl. No. 13/092,752 Office Action dated Feb. 5, 2013.
U.S. Appl. No. 13/092,752 Office Action dated Jul. 18, 2013.
U.S. Appl. No. 13/092,701 Office Action dated Jan. 28, 2013.
U.S. Appl. No. 13/092,701 Office Action dated Jul. 3, 2013.
U.S. Appl. No. 13/092,460 Office Action dated Jun. 21, 2013.
U.S. Appl. No. 13/042,259 Office Action dated Mar. 18, 2013.
U.S. Appl. No. 13/042,259 Office Action dated Jul. 31, 2013.
U.S. Appl. No. 13/092,580 Office Action dated Jun. 10, 2013.
U.S. Appl. No. 13/092,724 Office Action dated Jul. 16, 2013.
U.S. Appl. No. 13/092,724 Office Action dated Feb. 5, 2013.
U.S. Appl. No. 13/098,490 Office Action dated Dec. 21, 2012.
U.S. Appl. No. 13/098,490 Office Action dated Jul. 9, 2013.
U.S. Appl. No. 13/087,239 Office Action dated May 22, 2013.
U.S. Appl. No. 13/087,239 Office Action dated Dec. 5, 2012.
U.S. Appl. No. 12/725,249 Office Action dated Apr. 26, 2013.
U.S. Appl. No. 12/725,249 Office Action dated Sep. 12, 2012.
Brocade Fabric OS (FOS) 6.2 Virtual Fabrics Feature Frequently Asked Questions, 2009.
Brocade Unveils "The Effortless Network", http://newsroom.brocade.com/press-releases/brocade-unveils-the-effortless-network--nasdaq-brcd-0859535, 2012.
Foundry FastIron Configuration Guide, Software Release FSX 04.2.00b, Software Release FWS 04.3.00, Software Release FGS 05.0.00a, Sep. 26, 2008.
FastIron and TurboIron 24X Configuration Guide Supporting FSX 05.1.00 for FESX, FWSX, and FSX; FGS 04.3.03 for FGS, FLS and FWS; FGS 05.0.02 for FGS-STK and FLS-STK, FCX 06.0.00 for FCX; and TIX 04.1.00 for TI24X, Feb. 16, 2010.
FastIron Configuration Guide Supporting Ironware Software Release 07.0.00, Dec. 18, 2009.
"The Effortless Network: HyperEdge Technology for the Campus LAN", 2012.
Narten, T. et al. "Problem Statement: Overlays for Network Virtualization", draft-narten-nvo3-overlay-problem-statement-01, Oct. 31, 2011.
Knight, Paul et al., "Layer 2 and 3 Virtual Private Networks: Taxonomy, Technology, and Standardization Efforts", IEEE Communications Magazine, Jun. 2004.
"An Introduction to Brocade VCS Fabric Technology", Brocade white paper, http://community.brocade.com/docs/DOC-2954, Dec. 3, 2012.
Kreeger, L. et al., "Network Virtualization Overlay Control Protocol Requirements", Draft-kreeger-nvo3-overlay-cp-00, Jan. 30, 2012.
Knight, Paul et al., "Network based IP VPN Architecture using Virtual Routers", May 2003.
Louati, Wajdi et al., "Network-based virtual personal overlay networks using programmable virtual routers", IEEE Communications Magazine, Jul. 2005.
U.S. Appl. No. 13/092,877 Office Action dated Sep. 5, 2013.
Zhai F. Hu et al. 'RBridge: Pseudo-Nickname; draft-hu-trill-pseudonode-nickname-02.txt', May 15, 2012.

(56) References Cited

OTHER PUBLICATIONS

Huang, Nen-Fu et al., 'An Effective Spanning Tree Algorithm for a Bridged LAN', Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action dated Apr. 9, 2014, U.S. Appl. No. 13/092,752, filed Apr. 22, 2011.
Office Action dated Mar. 26, 2014, U.S. Appl. No. 13/092,701, filed Apr. 22, 2011.
Office Action dated Mar. 14, 2014, U.S. Appl. No. 13/092,460, filed Apr. 22, 2011.
Office Action dated Apr. 9, 2014, U.S. Appl. No. 13/092,724, filed Apr. 22, 2011.
Office Action for 13/425,238, filed Mar. 20, 2012, dated Mar. 6, 2014.
Office action dated Apr. 22, 2014, U.S. Appl. No. 13/030,806, filed Feb. 18, 2011.
Office Action for 13/092,752, filed Apr. 22, 2011, dated Apr. 9, 2014.
Office action dated Mar. 27, 2014, U.S. Appl. No. 13/098,490, filed May 2, 2011.
Office Action for U.S. Appl. No. 13/598,204, filed Aug. 29, 2012, dated Feb. 20, 2014.
Office action dated Aug. 29, 2014, U.S. Appl. No. 13/042,259, filed Mar. 7, 2011.
Office Action for U.S. Appl. No. 13/044,326, filed Mar. 9, 2011, dated Oct. 2, 2013.
'RBridges: Base Protocol Specification', IETF Draft, Perlman et al., Jun. 26, 2009.
Office Action for U.S. Appl. No. 13/092,887, dated Jan. 6, 2014.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office Action for U.S. Appl. No. 13/365,993, filed Feb. 3, 2012, from Cho, Hong Sol., dated Jul. 23, 2013.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Office action dated Jan. 6, 2014, U.S. Appl. No. 13/092,877, filed Apr. 22, 2011.
Office Action for U.S. Appl. No. 13/042,259, filed Mar. 7, 2011, from Jaroenchonwanit, Bunjob, dated Jan. 16, 2014.
Lapuh, Roger et al., 'Split Multi-link Trunking (SMLT) draft-lapuh-network-smlt-08', Jan. 2009.
Office Action for U.S. Appl. No. 13/351,513, filed Jan. 17, 2012, dated Feb. 28, 2014.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated Aug. 21, 2014, U.S. Appl. No. 13/184,526, filed Jul. 16, 2011.
Office action dated Aug. 4, 2014, U.S. Appl. No. 13/050,102, filed Mar. 17, 2011.
Office Action for U.S. Appl. No. 13/030,806, filed Feb. 18, 2011.
Office Action for U.S. Appl. No. 13/312,903, filed Dec. 6, 2011, dated Jun. 13, 2013.
Office Action for U.S. Appl. No. 13/092,873, filed Apr. 22, 2011.
Office Action for U.S. Appl. No. 13/184,526, filed Jul. 16, 2011, dated Dec. 2, 2013.
Office Action for U.S. Appl. No. 13/098,490, filed May 2, 2011, dated Mar. 27, 2014.
TRILL Working Group Internet-Draft Intended status: Proposed Standard RBridges: Base Protocol Specificaiton Mar. 3, 2010.
Office Action for U.S. Appl. No. 13/742,207, filed Jan. 15, 2013.
Office Action for U.S. Appl. No. 13/351,513, filed Jan. 17, 2012, dated Jul. 24, 2014.
Office Action for U.S. Appl. No. 13/087,239, filed Apr. 14, 2011, dated Dec. 5, 2012.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/556,061, filed Jul. 23, 2012, dated Jun. 6, 2014.
Office Action for U.S. Appl. No. 13/092,877, filed Apr. 22, 2011, dated Jun. 20, 2014.
Office Action for U.S. Appl. No. 13/092,873, filed Apr. 22, 2011, dated Jul. 25, 2014.
Office Action for U.S. Appl. No. 13/312,903, filed Dec. 6, 2011, dated Aug. 7, 2014.
Brocade 'An Introduction to Brocade VCS Fabric Technology', Dec. 3, 2012.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office Action for U.S. Appl. No. 13/950,974, filed Nov. 19, 2010, from Haile, Awet A., dated Dec. 2, 2012.
Office action dated May 24, 2012, U.S. Appl. No. 12/950,974, filed Nov. 19, 2010.
Office action dated Mar. 4, 2013, U.S. Appl. No. 13/092,877, filed Apr. 22, 2011.

(56) References Cited

OTHER PUBLICATIONS

Office action dated Sep. 5, 2013, U.S. Appl. No. 13/092,877, filed Apr. 22, 2011.
Office action dated Jun. 7, 2012, U.S. Appl. No. 12/950,968, filed Nov. 19, 2010.
Office action dated Jan. 4, 2013, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office Action for U.S. Appl. No. 13/533,843, filed Jun. 26, 2012, dated Oct. 21, 2013.
Office Action for U.S. Appl. No. 13/312,903, filed Dec. 6, 2011, dated Nov. 12, 2013.
Office Action for U.S. Appl. No. 13/092,873, filed Apr. 22, 2011, dated Nov. 29, 2013.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Touch, J. et al., 'Transparent Interconnection of Lots of Links (TRILL): Problem and Applicability Statement, May 2009, Network Working Group, pp. 1-17.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action Dated Jun. 10, 2015, U.S. Appl. No. 13/890,150, filed May 8, 2013.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/425,238, dated Mar. 12, 2015.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Rosen, E. et al., "BGP/MPLS VPNs", Mar. 1999.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.

* cited by examiner

| MAC | VLAN | GID |
|---|---|---|
| MAC-1 | X | P-GID-1 |
| MAC-2 | X | P-GID-2 |
| MAC-3 | X | P-GID-1 |
| MAC-4 | X | P-GID-2 |
| MAC-5 | X | P-GID-2 |
| MAC-6 | X | P-GID-2 |

PORT PROFILE MANAGEMENT FOR VIRTUAL CLUSTER SWITCHING

RELATED APPLICATIONS

This application claims the benefit of U.S. Provisional Application No. 61/350,838, entitled "PORT PROFILE MANAGEMENT FOR VIRTUAL CLUSTER SWITCHING," by inventors Dilip Chatwani, Suresh Vobbilisetty, and Phanidhar Koganti, filed 2 Jun. 2010, the disclosure of which is incorporated by reference herein.

The present disclosure is related to U.S. patent application Ser. No. 12/725,249, entitled "REDUNDANT HOST CONNECTION IN A ROUTED NETWORK," by inventors Somesh Gupta, Anoop Ghanwani, Phanidhar Koganti, and Shunjia Yu, filed 16 Mar. 2010, the disclosure of which is incorporated by reference herein.

BACKGROUND

1. Field

The present disclosure relates to network design. More specifically, the present disclosure relates to a method and system for managing per-port network parameter profiles in a virtual cluster switch.

2. Related Art

The relentless growth of the Internet has brought with it an insatiable demand for bandwidth. As a result, equipment vendors race to build larger, faster, and more versatile switches to move traffic. However, the size of a switch cannot grow infinitely. It is limited by physical space, power consumption, and design complexity, to name a few factors. More importantly, because an overly large system often does not provide economy of scale due to its complexity, simply increasing the size and throughput of a switch may prove economically unviable due to the increased per-port cost.

One way to increase the throughput of a switch system is to use switch stacking. In switch stacking, multiple smaller-scale, identical switches are interconnected in a special pattern to form a larger logical switch. However, switch stacking requires careful configuration of the ports and inter-switch links. The amount of required manual configuration becomes prohibitively complex and tedious when the stack reaches a certain size, which precludes switch stacking from being a practical option in building a large-scale switching system. Furthermore, a system based on stacked switches often has topology limitations which restrict the scalability of the system due to fabric bandwidth considerations.

In addition, the evolution of virtual computing has placed additional requirements on the network. For example, as the locations of virtual servers become more mobile and dynamic, it is often desirable that the network configuration can respond to the changes in a timely fashion. However, at present, there are no readily applicable solution that can achieve this goal without using proprietary communication protocols.

SUMMARY

One embodiment of the present invention provides a switch system. The switch includes a port profile which specifies a set of port configuration information. During operation, a control mechanism within the switch detects a source MAC address of an incoming frame and determines that the MAC address is associated with the port profile. The control mechanism then applies the port profile to a switch port on which the frame is received.

In a variation on this embodiment, the port profile is distributed throughout a virtual cluster switch comprising one or more physical switches which are allowed to be coupled in an arbitrary topology. In addition, the virtual cluster switch appears to be one single switch.

In a variation on this embodiment, the port profile is associated with one or more MAC addresses.

In a variation on this embodiment, the MAC address is assigned to a virtual machine.

In a variation on this embodiment, the port profile includes one or more sets of the following configuration information: Fibre Channel over Ethernet (FCoE) configuration; virtual LAN (VLAN) configuration; quality of service (QoS) configuration; and security related configuration.

In a variation on this embodiment, the switch includes a port which is allowed to couple to a computer system hosting a number of virtual machines.

In a variation on this embodiment, the application of the port profile is carried out within a predetermined time period after the incoming frame is received.

DETAILED DESCRIPTION

Figure 1A:
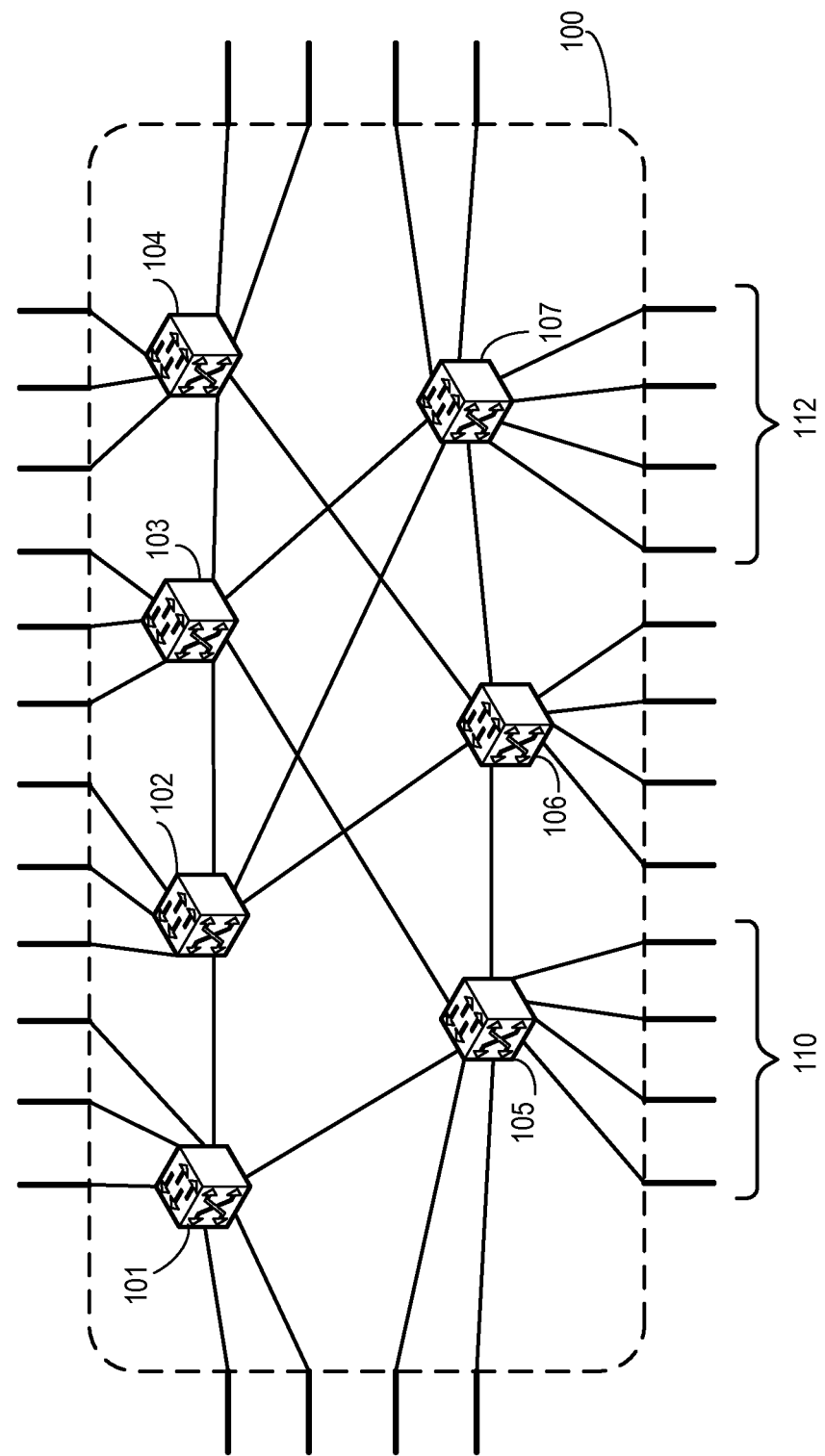
FIG. 1A illustrates an exemplary virtual cluster switch (VCS) system, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of dynamically provisioning a port specifically for a virtual machine is solved by creating a port profile for that virtual machine, and moving this port profile to a corresponding switch port as the virtual machine moves in the network. A large-scale logical switch (referred to as a "virtual cluster switch" or VCS herein) is formed using a number of smaller physical switches. The automatic configuration capability provided by the control plane running on each physical switch allows any number of switches to be connected in an arbitrary topology without requiring tedious manual configuration of the ports and links. This feature makes it possible to use many smaller, inexpensive switches to construct a large cluster switch, which can be viewed as a single logical switch externally. The VCS provides a name service which learns the Medium Access Control (MAC) addresses of devices coupled to any port of any of the member switch, and distributing this MAC address knowledge to every member switch in the VCS. Using this name service, the VCS can quickly detect when a virtual machine moves to a new location. The port profile corresponding to the virtual machine can then be automatically applied to the new location (i.e., the new physical switch port to which the virtual machine couples). This way, the network can respond quickly to the dynamic location changes of virtual machines. In this disclosure, the description in conjunction with FIGS. 1-9 is associated with the general architecture of VCS, and the description in conjunction with FIG. 10 and onward provide more details on the port profile management mechanisms.

It should be noted that a virtual cluster switch is not the same as conventional switch stacking. In switch stacking, multiple switches are interconnected at a common location (often within the same rack), based on a particular topology, and manually configured in a particular way. These stacked switches typically share a common address, e.g., IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a VCS can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm" which can be treated as a single, logical switch. Due to the automatic configuration capabilities of the VCS, an individual physical switch can dynamically join or leave the VCS without disrupting services to the rest of the network.

Furthermore, the automatic and dynamic configurability of VCS allows a network operator to build its switching system in a distributed and "pay-as-you-grow" fashion without sacrificing scalability. The VCS's ability to respond to changing network conditions makes it an ideal solution in a virtual computing environment, where network loads often change with time.

Although this disclosure is presented using examples based on the Transparent Interconnection of Lots of Links (TRILL) as the transport protocol and the Fibre Channel (FC) fabric protocol as the control-plane protocol, embodiments of the present invention are not limited to TRILL networks, or networks defined in a particular Open System Interconnection Reference Model (OSI reference model) layer. For example, a VCS can also be implemented with switches running multi-protocol label switching (MPLS) protocols for the transport. In addition, the terms "RBridge" and "switch" are used interchangeably in this disclosure. The use of the term "RBridge" does not limit embodiments of the present invention to TRILL networks only. The TRILL protocol is described in IETF draft "RBridges: Base Protocol Specification," available at http://tools.ietf.org/html/draft-ietf-trill-rbridge-protocol, which is incorporated by reference herein The terms "virtual cluster switch," "virtual cluster switching," and "VCS" refer to a group of interconnected physical switches operating as a single logical switch. The control plane for these physical switches provides the ability to automatically configure a given physical switch, so that when it joins the VCS, little or no manual configuration is required.

The term "RBridge" refers to routing bridges, which are bridges implementing the TRILL protocol as described in IETF draft "RBridges: Base Protocol Specification." Embodiments of the present invention are not limited to the application among RBridges. Other types of switches, routers, and forwarders can also be used.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

VCS Architecture

FIG. 1A illustrates an exemplary virtual cluster switch system, in accordance with an embodiment of the present invention. In this example, a VCS 100 includes physical switches 101, 102, 103, 104, 105, 106, and 107. A given physical switch runs an Ethernet-based transport protocol on its ports (e.g., TRILL on its inter-switch ports, and Ethernet transport on its external ports), while its control plane runs an FC switch fabric protocol stack. The TRILL protocol facilitates transport of Ethernet frames within and across VCS 100 in a routed fashion (since TRILL provides routing functions to Ethernet frames). The FC switch fabric protocol stack facilitates the automatic configuration of individual physical switches, in a way similar to how a conventional FC switch fabric is formed and automatically configured. In one embodiment, VCS 100 can appear externally as an ultra-high-capacity Ethernet switch. More details on FC network architecture, protocols, naming/address conventions, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosures of which are incorporated by reference in their entirety herein.

A physical switch may dedicate a number of ports for external use (i.e., to be coupled to end hosts or other switches external to the VCS) and other ports for inter-switch connection. Viewed externally, VCS 100 appears to be one switch to a device from the outside, and any port from any of the physical switches is considered one port on the VCS. For example, port groups 110 and 112 are both VCS external ports and can be treated equally as if they were ports on a common physical switch, although switches 105 and 107 may reside in two different locations.

The physical switches can reside at a common location, such as a data center or central office, or be distributed in different locations. Hence, it is possible to construct a large-scale centralized switching system using many smaller, inexpensive switches housed in one or more chassis at the same location. It is also possible to have the physical switches placed at different locations, thus creating a logical switch that can be accessed from multiple locations. The topology used to interconnect the physical switches can also be versatile. VCS 100 is based on a mesh topology. In further embodiments, a VCS can be based on a ring, fat tree, or other types of topologies.

In one embodiment, the protocol architecture of a VCS is based on elements from the standard IEEE 802.1Q Ethernet bridge, which is emulated over a transport based on the Fibre Channel Framing and Signaling-2 (FC-FS-2) standard. The resulting switch is capable of transparently switching frames from an ingress Ethernet port from one of the edge switches to an egress Ethernet port on a different edge switch through the VCS.

Figure 1B:
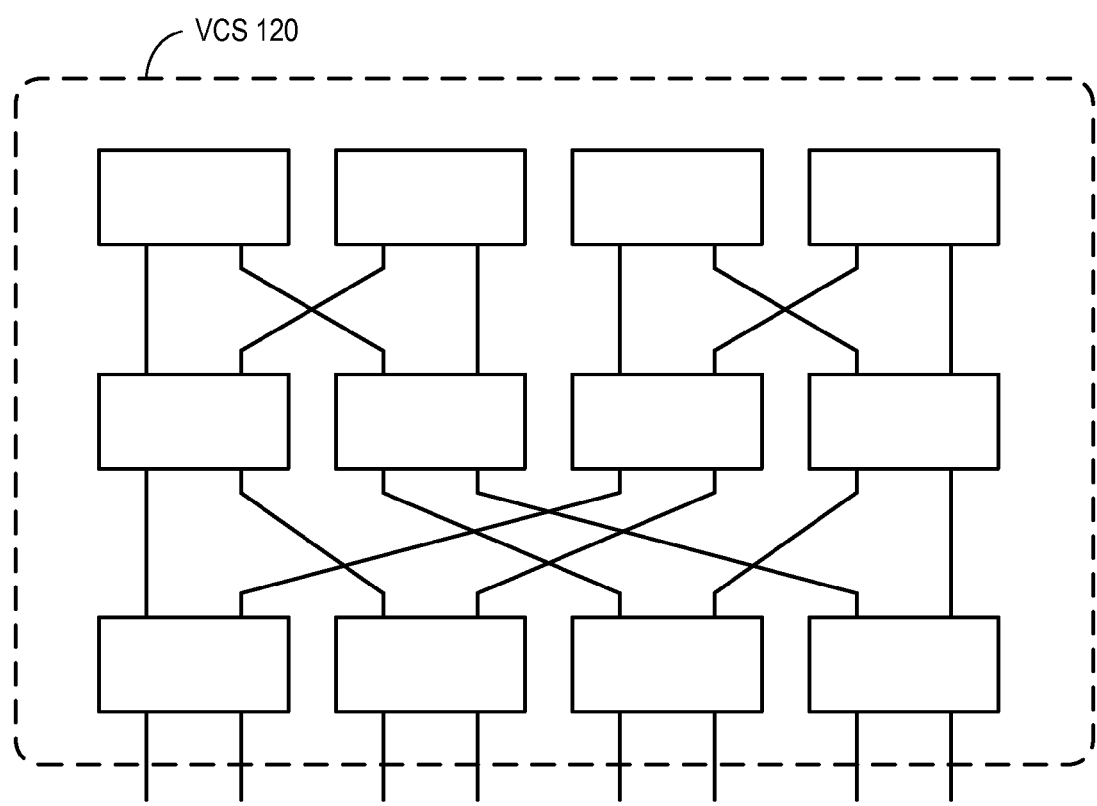
FIG. 1B illustrates an exemplary VCS system where the member switches are configured in a CLOS network, in accordance with an embodiment of the present invention.

Because of its automatic configuration capability, a VCS can be dynamically expanded as the network demand increases. In addition, one can build a large-scale switch using many smaller physical switches without the burden of manual configuration. For example, it is possible to build a high-throughput fully non-blocking switch using a number of smaller switches. This ability to use small switches to build a large non-blocking switch significantly reduces the cost associated switch complexity. FIG. 1B presents an exemplary VCS with its member switches connected in a CLOS network, in accordance with one embodiment of the present invention. In this example, a VCS 120 forms a fully non-blocking 8×8 switch, using eight 4×4 switches and four 2×2 switches connected in a three-stage CLOS network. A large-scale switch with a higher port count can be built in a similar way.

Figure 2:
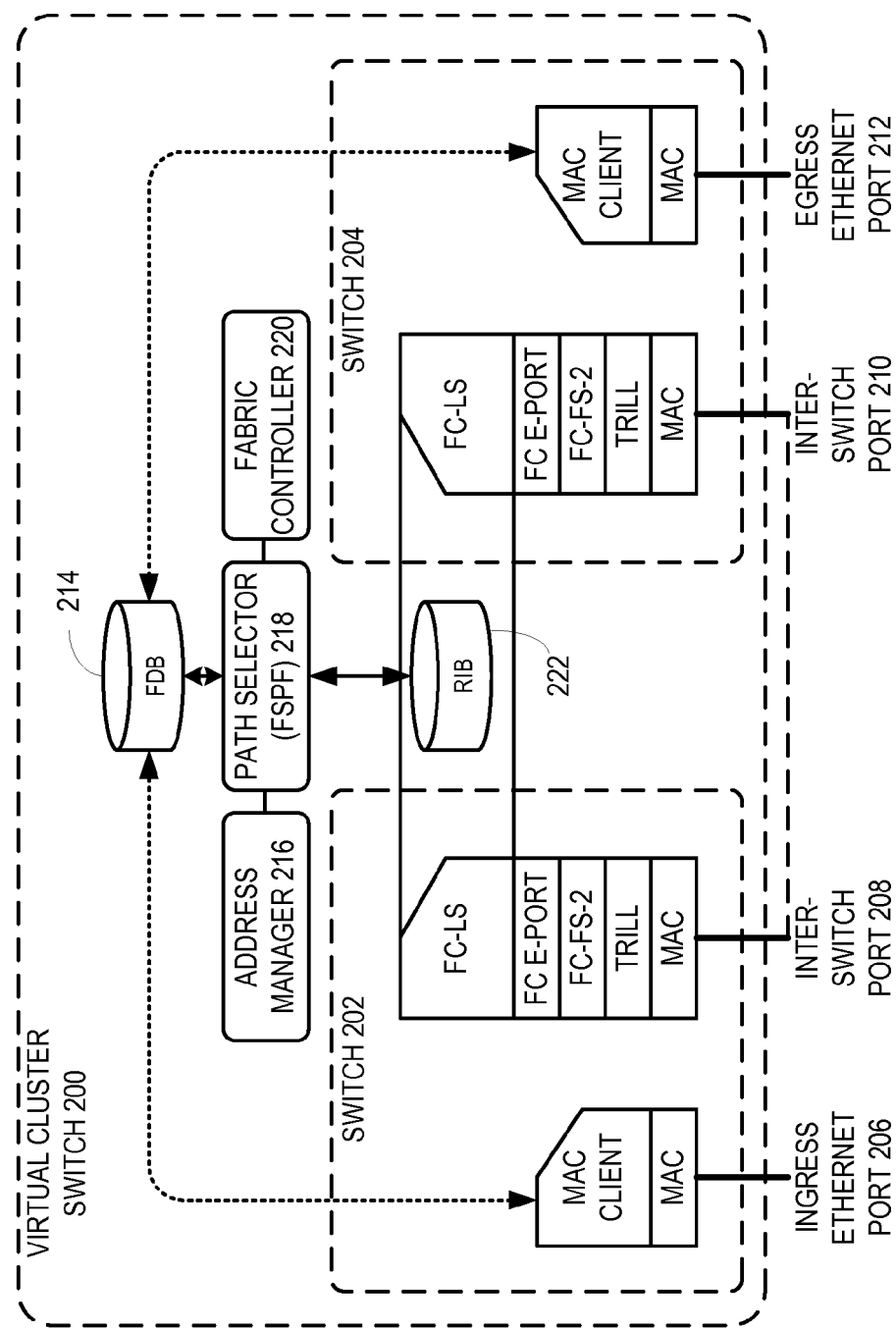
FIG. 2 illustrates the protocol stack within a virtual cluster switch, in accordance with an embodiment of the present invention.

FIG. 2 illustrates the protocol stack within a virtual cluster switch, in accordance with an embodiment of the present invention. In this example, two physical switches 202 and 204 are illustrated within a VCS 200. Switch 202 includes an ingress Ethernet port 206 and an inter-switch port 208. Switch 204 includes an egress Ethernet port 212 and an inter-switch port 210. Ingress Ethernet port 206 receives Ethernet frames from an external device. The Ethernet header is processed by a medium access control (MAC) layer protocol. On top of the MAC layer is a MAC client layer, which hands off the information extracted from the frame's Ethernet header to a forwarding database (FDB) 214. Typically, in a conventional IEEE 802.1Q Ethernet switch, FDB 214 is maintained locally in a switch, which would perform a lookup based on the destination MAC address and the VLAN indicated in the Ethernet frame. The lookup result would provide the corresponding output port. However, since VCS 200 is not one single physical switch, FDB 214 would return the egress switch's identifier (i.e., switch 204's identifier). In one embodiment, FDB 214 is a data structure replicated and distributed among all the physical switches. That is, every physical switch maintains its own copy of FDB 214. When a given physical switch learns the source MAC address and VLAN of an Ethernet frame (similar to what a conventional IEEE 802.1 Q Ethernet switch does) as being reachable via the ingress port, the learned MAC and VLAN information, together with the ingress Ethernet port and switch information, is propagated to all the physical switches so every physical switch's copy of FDB 214 can remain synchronized. This prevents forwarding based on stale or incorrect information when there are changes to the connectivity of end stations or edge networks to the VCS.

The forwarding of the Ethernet frame between ingress switch 202 and egress switch 204 is performed via inter-switch ports 208 and 210. The frame transported between the two inter-switch ports is encapsulated in an outer MAC header and a TRILL header, in accordance with the TRILL standard. The protocol stack associated with a given inter-switch port includes the following (from bottom up): MAC layer, TRILL layer, FC-FS-2 layer, FC E-Port layer, and FC link services (FC-LS) layer. The FC-LS layer is responsible for maintaining the connectivity information of a physical switch's neighbor, and populating an FC routing information base (RIB) 222. This operation is similar to what is done in an FC switch fabric. The FC-LS protocol is also responsible for handling joining and departure of a physical switch in VCS 200. The operation of the FC-LS layer is specified in the FC-LS standard, which is available at http://www.t11.org/ftp/t11/member/fc/ls/06-393v5.pdf, the disclosure of which is incorporated herein in its entirety.

During operation, when FDB 214 returns the egress switch 204 corresponding to the destination MAC address of the ingress Ethernet frame, the destination egress switch's identifier is passed to a path selector 218. Path selector 218 performs a fabric shortest-path first (FSPF)-based route lookup in conjunction with RIB 222, and identifies the next-hop switch within VCS 200. In other words, the routing is performed by the FC portion of the protocol stack, similar to what is done in an FC switch fabric.

Also included in each physical switch are an address manager 216 and a fabric controller 220. Address manager 216 is responsible for configuring the address of a physical switch when the switch first joins the VCS. For example, when switch 202 first joins VCS 200, address manager 216 can negotiate a new FC switch domain ID, which is subsequently used to identify the switch within VCS 200. Fabric controller 220 is responsible for managing and configuring the logical FC switch fabric formed on the control plane of VCS 200.

One way to understand the protocol architecture of VCS is to view the VCS as an FC switch fabric with an Ethernet/TRILL transport. Each physical switch, from an external point of view, appears to be a TRILL RBridge. However, the switch's control plane implements the FC switch fabric software. In other words, embodiments of the present invention facilitate the construction of an "Ethernet switch fabric" running on FC control software. This unique combination provides the VCS with automatic configuration capability and allows it to provide the ubiquitous Ethernet services in a very scalable fashion.

Figure 3:
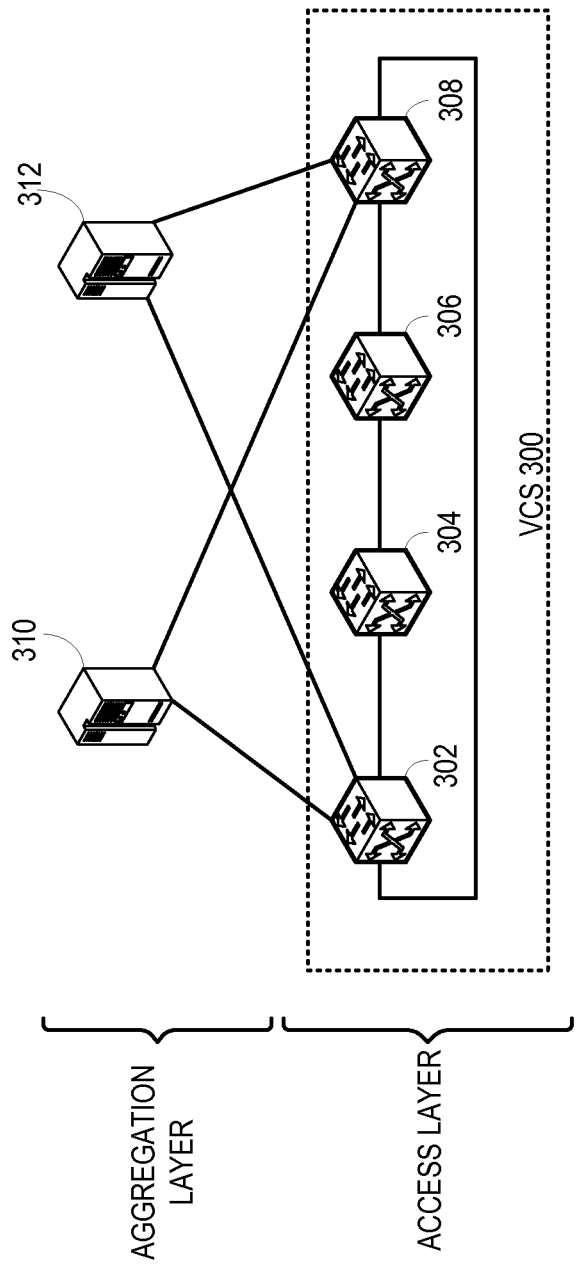
FIG. 3 illustrates an exemplary configuration of a virtual cluster switch, in accordance with an embodiment of the present invention.

FIG. 3 illustrates an exemplary configuration of a virtual cluster switch, in accordance with an embodiment of the present invention. In this example, a VCS 300 includes four physical switches 302, 304, 306, and 308. VCS 300 constitutes an access layer which is coupled to two aggregation switches 310 and 312. Note that the physical switches within VCS 300 are connected in a ring topology. Aggregation switch 310 or 312 can connect to any of the physical switches within VCS 300. For example, aggregation switch 310 is coupled to physical switches 302 and 308. These two links are viewed as a trunked link to VCS 300, since the corresponding ports on switches 302 and 308 are considered to be from the same logical switch, VCS 300. Note that, without VCS, such topology would not have been possible, because the FDB needs to remain synchronized, which is facilitated by the VCS.

Figure 4:
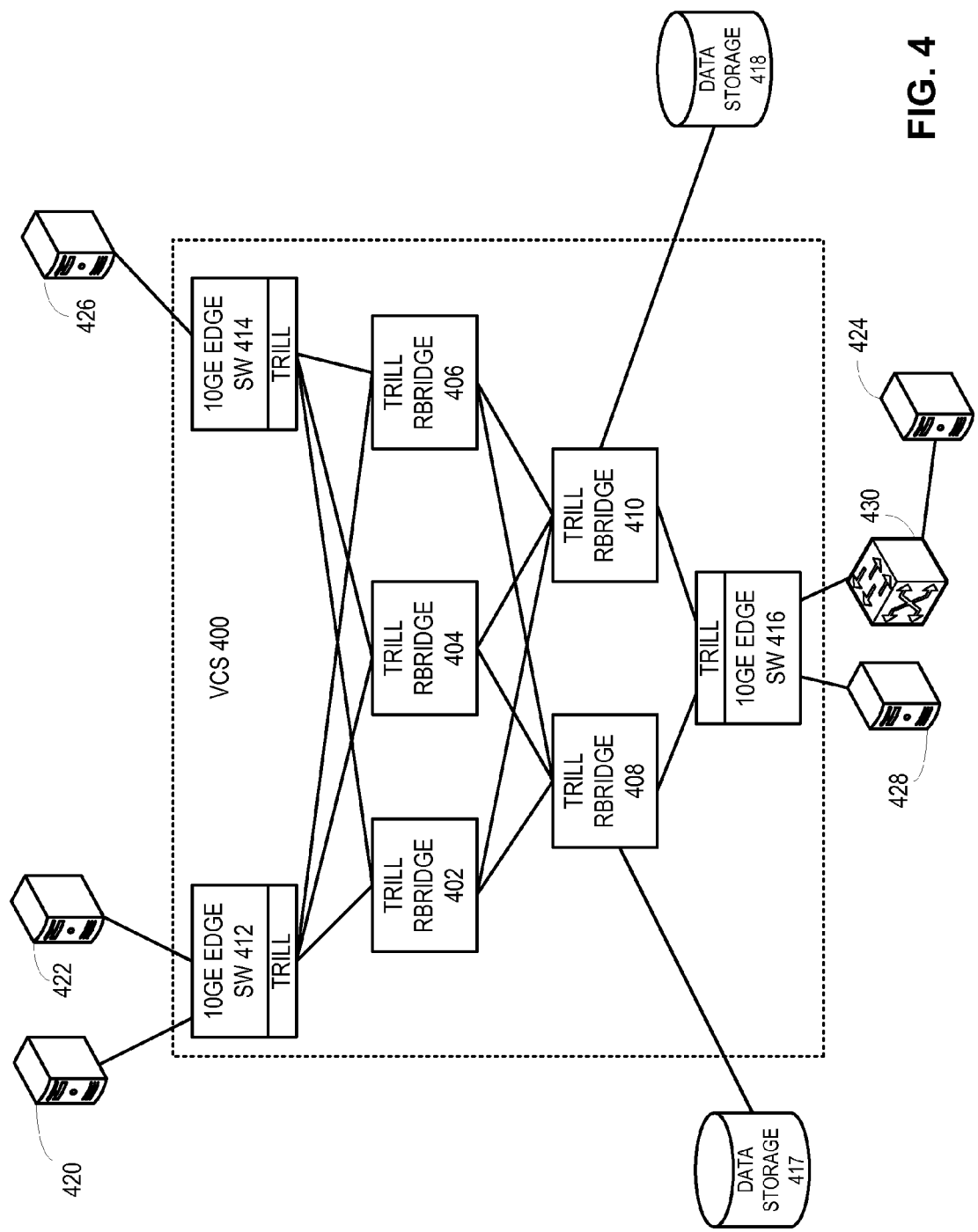
FIG. 4 illustrates an exemplary configuration of how a virtual cluster switch can be connected to different edge networks, in accordance with an embodiment of the present invention.

FIG. 4 illustrates an exemplary configuration of how a virtual cluster switch can be connected to different edge networks, in accordance with an embodiment of the present invention. In this example, a VCS 400 includes a number of TRILL RBridges 402, 404, 406, 408, and 410, which are controlled by the FC switch-fabric control plane. Also included in VCS 400 are RBridges 412, 414, and 416. Each RBridge has a number of edge ports which can be connected to external edge networks.

For example, RBridge 412 is coupled with hosts 420 and 422 via 10GE ports. RBridge 414 is coupled to a host 426 via a 10GE port. These RBridges have TRILL-based inter-switch ports for connection with other TRILL RBridges in VCS 400. Similarly, RBridge 416 is coupled to host 428 and an external Ethernet switch 430, which is coupled to an external network that includes a host 424. In addition, network equipment can also be coupled directly to any of the physical switches in VCS 400. As illustrated here, TRILL RBridge 408 is coupled to a data storage 417, and TRILL RBridge 410 is coupled to a data storage 418.

Although the physical switches within VCS 400 are labeled as "TRILL RBridges," they are different from the conventional TRILL RBridge in the sense that they are controlled by the FC switch fabric control plane. In other words, the assignment of switch addresses, link discovery and maintenance, topology convergence, routing, and forwarding can be handled by the corresponding FC protocols. Particularly, each TRILL RBridge's switch ID or nickname is mapped from the corresponding FC switch domain ID, which can be automatically assigned when a switch joins VCS 400 (which is logically similar to an FC switch fabric).

Note that TRILL is only used as a transport between the switches within VCS 400. This is because TRILL can readily accommodate native Ethernet frames. Also, the TRILL standards provide a ready-to-use forwarding mechanism that can be used in any routed network with arbitrary topology (although the actual routing in VCS is done by the FC switch fabric protocols). Embodiments of the present invention should be not limited to using only TRILL as the transport. Other protocols (such as multi-protocol label switching (MPLS) or Internet Protocol (IP)), either public or proprietary, can also be used for the transport.

VCS Formation

In one embodiment, a VCS is created by instantiating a logical FC switch in the control plane of each switch. After the logical FC switch is created, a virtual generic port (denoted as G_Port) is created for each Ethernet port on the RBridge. A G_Port assumes the normal G_Port behavior from the FC switch perspective. However, in this case, since the physical links are based on Ethernet, the specific transition from a G_Port to either an FC F_Port or E_Port is determined by the underlying link and physical layer protocols. For example, if the physical Ethernet port is connected to an external device which lacks VCS capabilities, the corresponding G_Port will be turned into an F_Port. On the other hand, if the physical Ethernet port is connected to a switch with VCS capabilities and it is confirmed that the switch on the other side is part of a VCS, then the G_Port will be turned into an E_port.

Figure 5A:
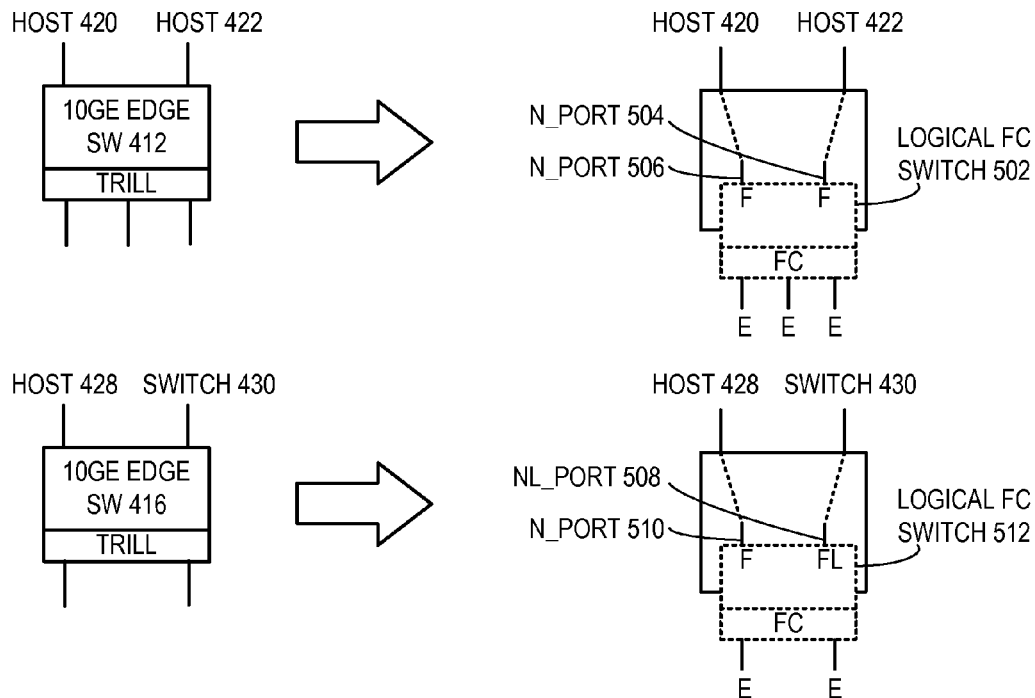
FIG. 5A illustrates how a logical Fibre Channel switch fabric is formed in a virtual cluster switch in conjunction with the example in FIG. 4, in accordance with an embodiment of the present invention.

FIG. 5A illustrates how a logical Fibre Channel switch fabric is formed in a virtual cluster switch in conjunction with the example in FIG. 4, in accordance with an embodiment of the present invention. RBridge 412 contains a virtual, logical FC switch 502. Corresponding to the physical Ethernet ports coupled to hosts 420 and 422, logical FC switch 502 has two logical F_Ports, which are logically coupled to hosts 420 and 422. In addition, two logical N_Ports, 506 and 504, are created for hosts 420 and 422, respectively. On the VCS side, logical FC switch 502 has three logical E_Ports, which are to be coupled with other logical FC switches in the logical FC switch fabric in the VCS.

Similarly, RBridge 416 contains a virtual, logical FC switch 512. Corresponding to the physical Ethernet ports coupled to host 428 and external switch 430, logical FC switch 512 has a logical F_Port coupled to host 428, and a logical FL_Port coupled to switch 430. In addition, a logical N_Port 510 is created for host 428, and a logical NL_Port 508 is created for switch 430. Note that the logical FL_Port is created because that port is coupled to a switch (switch 430), instead of a regular host, and therefore logical FC switch 512 assumes an arbitrated loop topology leading to switch 430. Logical NL_Port 508 is created based on the same reasoning to represent a corresponding NL_Port on switch 430. On the VCS side, logical FC switch 512 has two logical E_Ports, which to be coupled with other logical FC switches in the logical FC switch fabric in the VCS.

Figure 5B:
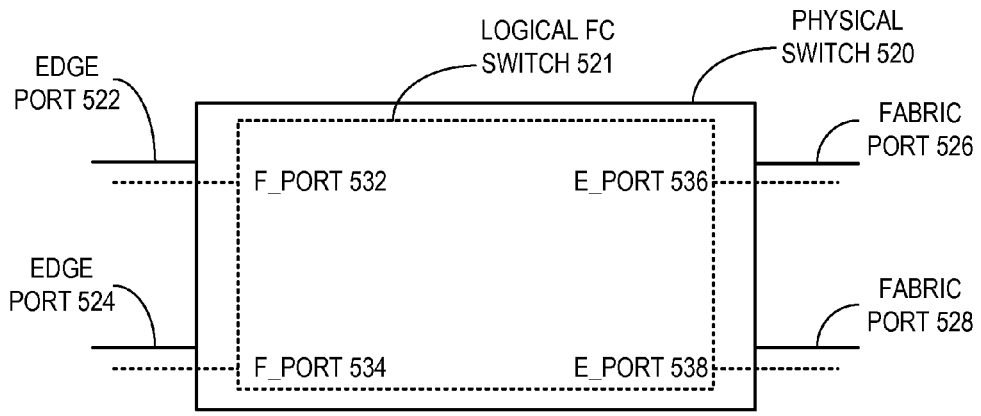
FIG. 5B illustrates an example of how a logical FC switch can be created within a physical Ethernet switch, in accordance with one embodiment of the present invention.

FIG. 5B illustrates an example of how a logical FC switch can be created within a physical Ethernet switch, in accordance with one embodiment of the present invention. The term "fabric port" refers to a port used to couple multiple switches in a VCS. The clustering protocols control the forwarding between fabric ports. The term "edge port" refers to a port that is not currently coupled to another switch unit in the VCS. Standard IEEE 802.1Q and layer-3 protocols control forwarding on edge ports.

In the example illustrated in FIG. 5B, a logical FC switch 521 is created within a physical switch (RBridge) 520. Logical FC switch 521 participates in the FC switch fabric protocol via logical inter-switch links (ISLs) to other switch units and has an FC switch domain ID assigned to it just as a physical FC switch does. In other words, the domain allocation, principal switch selection, and conflict resolution work just as they would on a physical FC ISL.

The physical edge ports 522 and 524 are mapped to logical F_Ports 532 and 534, respectively. In addition, physical fabric ports 526 and 528 are mapped to logical E_Ports 536 and 538, respectively. Initially, when logical FC switch 521 is created (for example, during the boot-up sequence), logical FC switch 521 only has four G_Ports which correspond to the four physical ports. These G_Ports are subsequently mapped to F_Ports or E_Ports, depending on the devices coupled to the physical ports.

Neighbor discovery is the first step in VCS formation between two VCS-capable switches. It is assumed that the verification of VCS capability can be carried out by a handshake process between two neighbor switches when the link is first brought up.

In general, a VCS presents itself as one unified switch composed of multiple member switches. Hence, the creation and configuration of VCS is of critical importance. The VCS configuration is based on a distributed database, which is replicated and distributed over all switches.

In one embodiment, a VCS configuration database includes a global configuration table (GT) of the VCS and a list of switch description tables (STs), each of which describes a VCS member switch. In its simplest form, a member switch can have a VCS configuration database that includes a global table and one switch description table, e.g., [<GT><ST>]. A VCS with multiple switches will have a configuration database that has a single global table and multiple switch description tables, e.g., [<GT><ST0><ST1> . . . <STn-1>]. The number n corresponds to the number of member switches in the VCS. In one embodiment, the GT can include at least the following information: the VCS ID, number of nodes in the VCS, a list of VLANs supported by the VCS, a list of all the switches (e.g., list of FC switch domain IDs for all active switches) in the VCS, and the FC switch domain ID of the principal switch (as in a logical FC switch fabric). A switch description table can include at least the following information: the IN_VCS flag, indication whether the switch is a principal switch in the logical FC switch fabric, the FC switch domain ID for the switch, the FC world-wide name (WWN) for the corresponding logical FC switch; the mapped ID of the switch, and optionally the IP address of the switch.

In addition, each switch's global configuration database is associated with a transaction ID. The transaction ID specifies the latest transaction (e.g., update or change) incurred to the global configuration database. The transaction IDs of the global configuration databases in two switches can be compared to determine which database has the most current information (i.e., the database with the more current transaction ID is more up-to-date). In one embodiment, the transaction ID is the switch's serial number plus a sequential transaction number. This configuration can unambiguously resolve which switch has the latest configuration.

Figure 6:
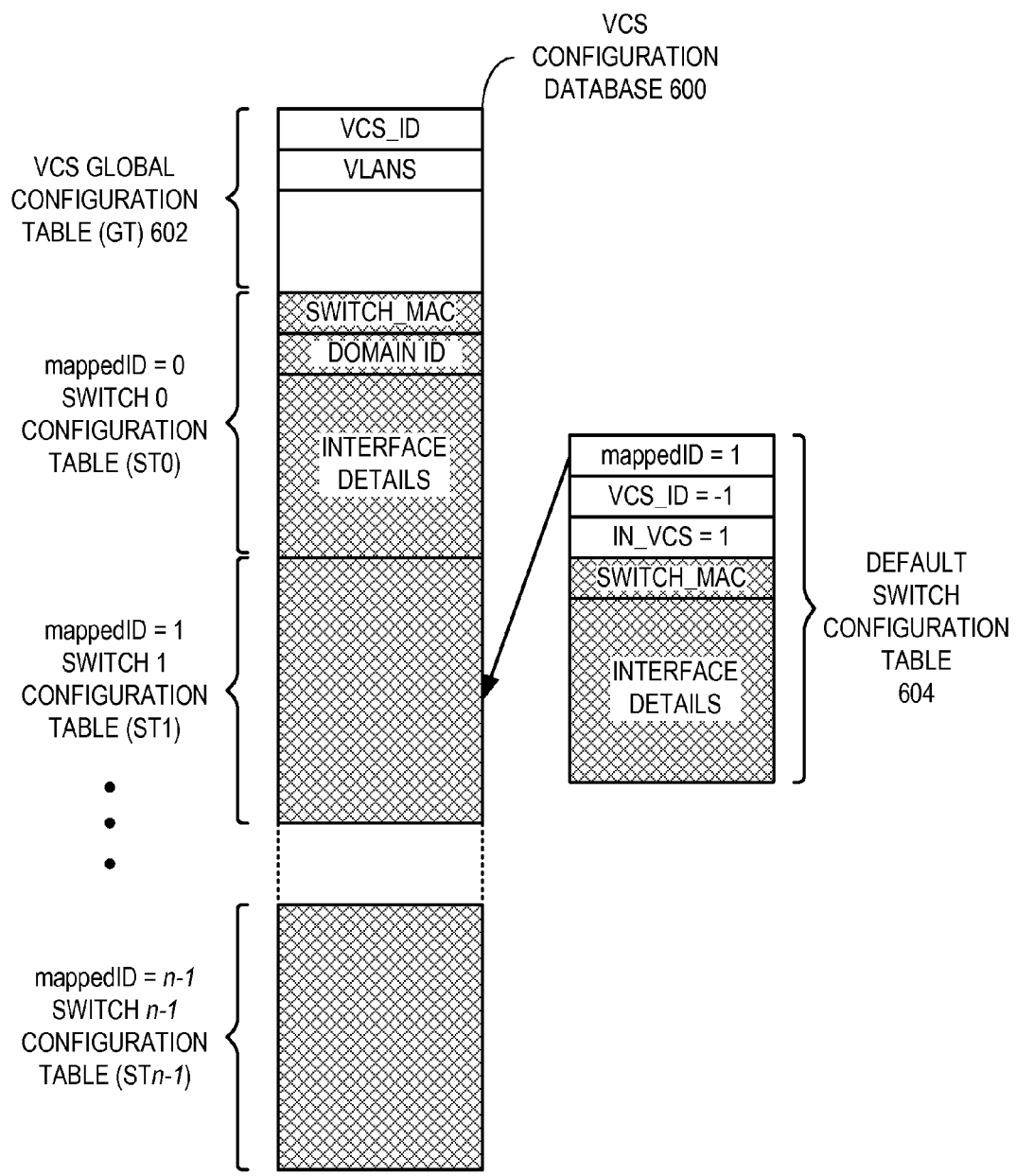
FIG. 6 illustrates an exemplary VCS configuration database, in accordance with an embodiment of the present invention.

As illustrated in FIG. 6, a VCS member switch typically maintains two configuration tables that describe its instance: a VCS configuration database 600, and a default switch configuration table 604. VCS configuration database 600 describes the VCS configuration when the switch is part of a VCS. Default switch configuration table 604 describes the switch's default configuration. VCS configuration database 600 includes a GT 602, which includes a VCS identifier (denoted as VCS_ID) and a VLAN list within the VCS. Also included in VCS configuration database 600 are a number of STs, such as ST0, ST1, and STn. Each ST includes the corresponding member switch's MAC address and FC switch domain ID, as well as the switch's interface details.

Note that each switch also has a VCS-mapped ID which is a switch index within the VCS.

In one embodiment, each switch also has a VCS-mapped ID (denoted as "mappedID"), which is a switch index within the VCS. This mapped ID is unique and persistent within the VCS. That is, when a switch joins the VCS for the first time, the VCS assigns a mapped ID to the switch. This mapped ID persists with the switch, even if the switch leaves the VCS. When the switch joins the VCS again at a later time, the same mapped ID is used by the VCS to retrieve previous configuration information for the switch. This feature can reduce the amount of configuration overhead in VCS. Also, the persistent mapped ID allows the VCS to "recognize" a previously configured member switch when it re-joins the VCS, since a dynamically assigned FC fabric domain ID would change each time the member switch joins and is configured by the VCS.

Default switch configuration table 604 has an entry for the mappedID that points to the corresponding ST in VCS configuration database 600. Note that only VCS configuration database 600 is replicated and distributed to all switches in the VCS. Default switch configuration table 604 is local to a particular member switch.

The "IN_VCS" value in default switch configuration table 604 indicates whether the member switch is part of a VCS. A switch is considered to be "in a VCS" when it is assigned one of the FC switch domains by the FC switch fabric with two or more switch domains. If a switch is part of an FC switch fabric that has only one switch domain, i.e., its own switch domain, then the switch is considered to be "not in a VCS."

When a switch is first connected to a VCS, the logical FC switch fabric formation process allocates a new switch domain ID to the joining switch. In one embodiment, only the switches directly connected to the new switch participate in the VCS join operation.

Note that in the case where the global configuration database of a joining switch is current and in sync with the global configuration database of the VCS based on a comparison of the transaction IDs of the two databases (e.g., when a member switch is temporarily disconnected from the VCS and re-connected shortly afterward), a trivial merge is performed. That is, the joining switch can be connected to the VCS, and no change or update to the global VCS configuration database is required.

Figure 7:
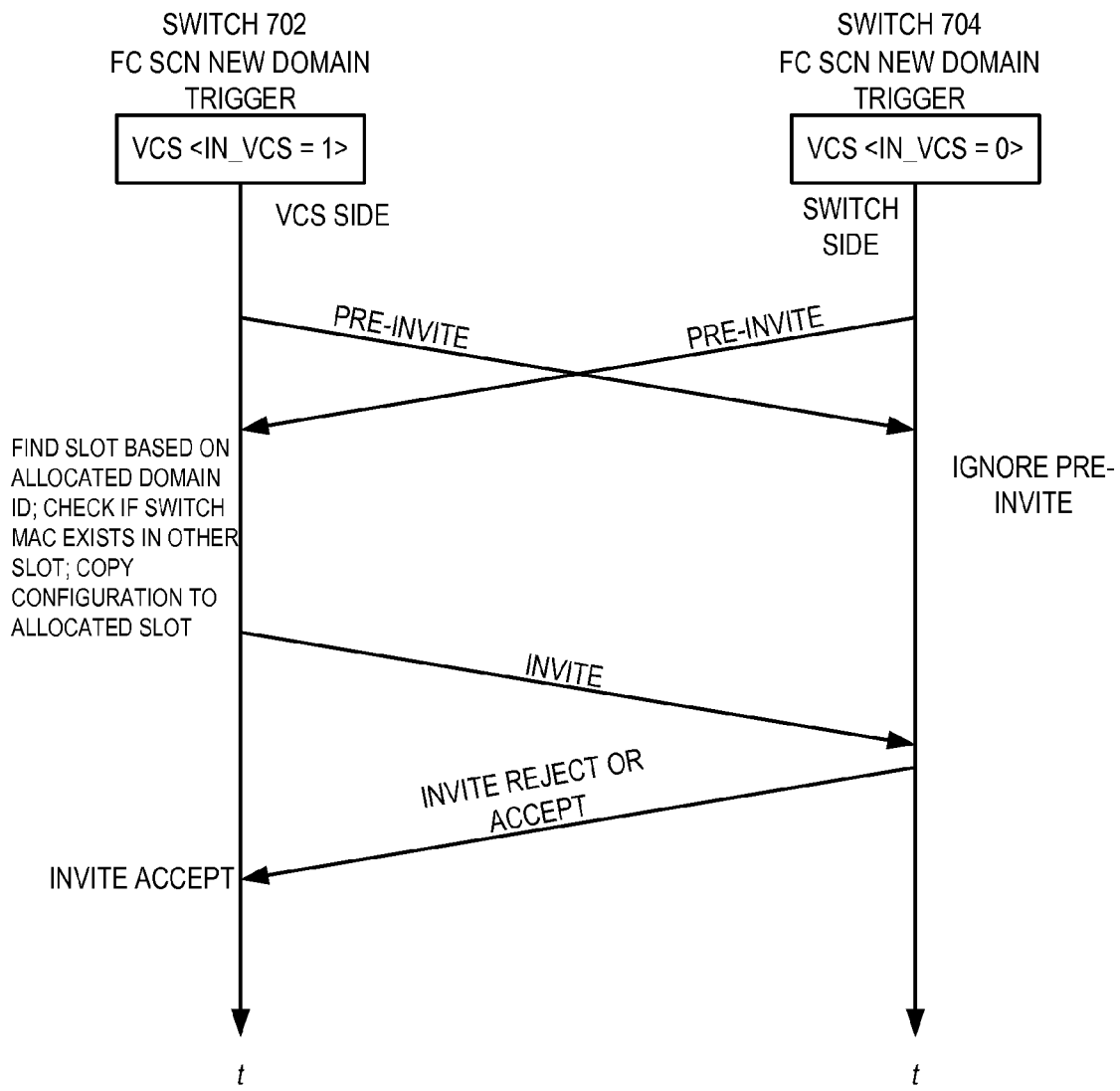
FIG. 7 illustrates an exemplary process of a switch joining a virtual cluster switch, in accordance with an embodiment of the present invention.

FIG. 7 illustrates an exemplary process of a switch joining a virtual cluster switch, in accordance with an embodiment of the present invention. In this example, it is assumed that a switch 702 is within an existing VCS, and a switch 704 is joining the VCS. During operation, both switches 702 and 704 trigger an FC State Change Notification (SCN) process. Subsequently, both switches 702 and 704 perform a PRE-INVITE operation. The pre-invite operation involves the following process.

When a switch joins the VCS via a link, both neighbors on each end of the link present to the other switch a VCS four-tuple of <Prior VCS_ID, SWITCH_MAC, mappedID, IN_VCS> from a prior incarnation, if any. Otherwise, the switch presents to the counterpart a default tuple. If the VCS_ID value was not set from a prior join operation, a VCS_ID value of −1 is used. In addition, if a switch's IN_VCS flag is set to 0, it sends out its interface configuration to the neighboring switch. In the example in FIG. 7, both switches 702 and 704 send the above information to the other switch.

After the above PRE-INVITE operation, a driver switch for the join process is selected. By default, if a switch's IN_VCS value is 1 and the other switch's IN_VCS value is 0, the switch with IN_VCS=1 is selected as the driver switch. If both switches have their IN_VCS values as 1, then nothing happens, i.e., the PRE-INVITE operation would not lead to an INVITE operation. If both switches have their IN_VCS values as 0, then one of the switches is elected to be the driving switch (for example, the switch with a lower FC switch domain ID value). The driving switch's IN_VCS value is then set to 1 and drives the join process.

After switch 702 is selected as the driver switch, switch 702 then attempts to reserve a slot in the VCS configuration database corresponding to the mappedID value in switch 704's PRE-INVITE information. Next, switch 702 searches the VCS configuration database for switch 704's MAC address in any mappedID slot. If such a slot is found, switch 702 copies all information from the identified slot into the reserved slot. Otherwise, switch 702 copies the information received during the PRE-INVITE from switch 704 into the VCS configuration database. The updated VCS configuration database is then propagated to all the switches in the VCS as a prepare operation in the database (note that the update is not committed to the database yet).

Subsequently, the prepare operation may or may not result in configuration conflicts, which may be flagged as warnings or fatal errors. Such conflicts can include inconsistencies between the joining switch's local configuration or policy setting and the VCS configuration. For example, a conflict arises when the joining switch is manually configured to allow packets with a particular VLAN value to pass through, whereas the VCS does not allow this VLAN value to enter the switch fabric from this particular RBridge (for example, when this VLAN value is reserved for other purposes). In one embodiment, the prepare operation is handled locally and/or remotely in concert with other VCS member switches. If there is an un-resolvable conflict, switch 702 sends out a PRE-INVITE-FAILED message to switch 704. Otherwise, switch 702 generates an INVITE message with the VCS's merged view of the switch (i.e., the updated VCS configuration database).

Upon receiving the INVITE message, switch 704 either accepts or rejects the INVITE. The INVITE can be rejected if the configuration in the INVITE is in conflict with what switch 704 can accept. If the INVITE is acceptable, switch 704 sends back an INVITE-ACCEPT message in response. The INVITE-ACCEPT message then triggers a final database commit throughout all member switches in the VCS. In other words, the updated VCS configuration database is updated, replicated, and distributed to all the switches in the VCS.

Layer-2 Services in VCS

In one embodiment, each VCS switch unit performs source MAC address learning, similar to what an Ethernet bridge does. Each {MAC address, VLAN} tuple learned on a physical port on a VCS switch unit is registered into the local Fibre Channel Name Server (FC-NS) via a logical Nx_Port interface corresponding to that physical port. This registration binds the address learned to the specific interface identified by the Nx_Port. Each FC-NS instance on each VCS switch unit coordinates and distributes all locally learned {MAC address, VLAN} tuples with every other FC-NS instance in the fabric. This feature allows the dissemination of locally learned {MAC addresses, VLAN} information to every switch in the VCS. In one embodiment, the learned MAC addresses are aged locally by individual switches.

Figure 8:
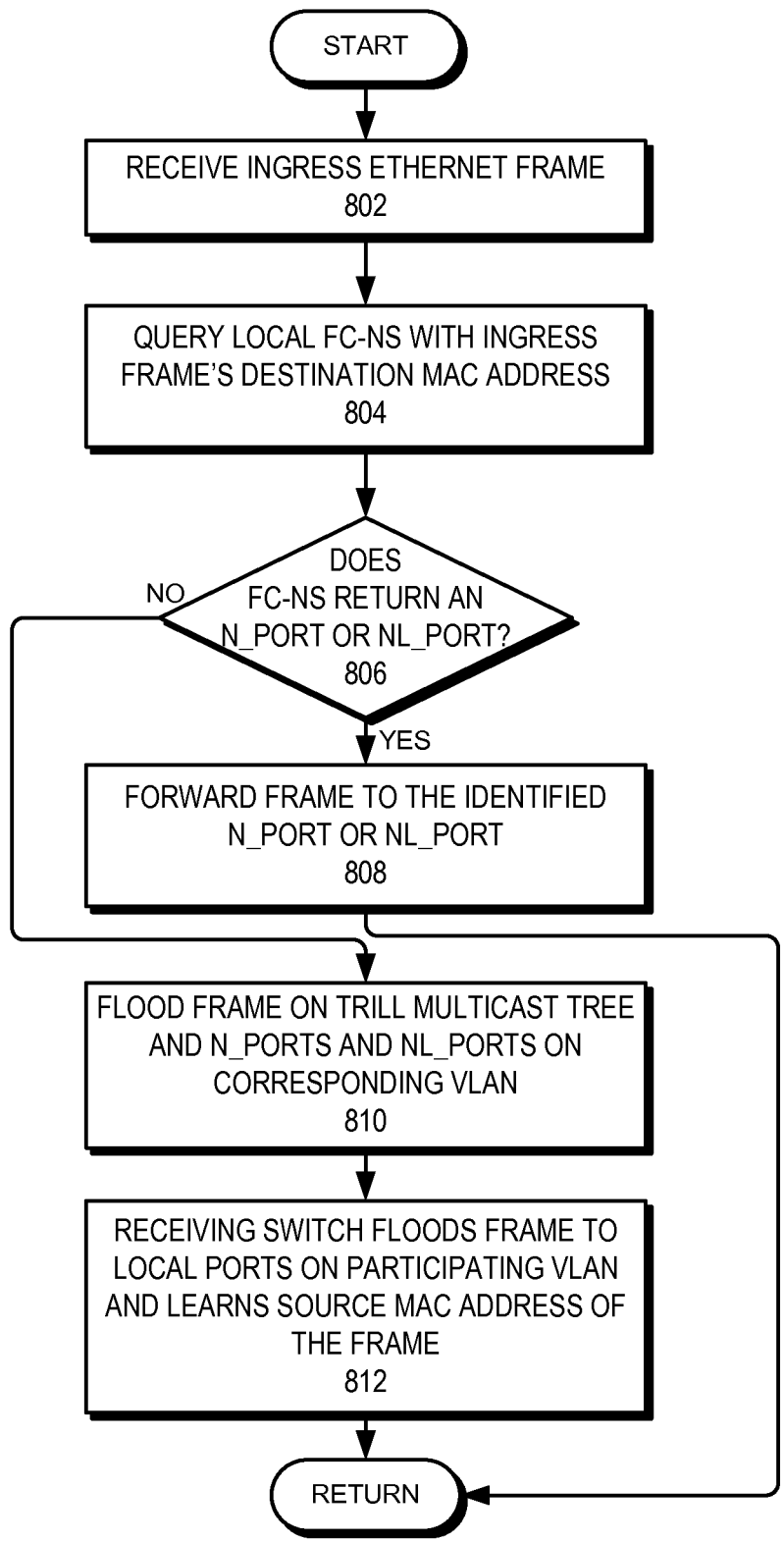
FIG. 8 presents a flowchart illustrating the process of looking up an ingress frame's destination MAC address and forwarding the frame in a VCS, in accordance with one embodiment of the present invention.

FIG. 8 presents a flowchart illustrating the process of looking up an ingress frame's destination MAC address and forwarding the frame in a VCS, in accordance with one embodiment of the present invention. During operation, a VCS switch receives an Ethernet frame at one of its Ethernet ports (operation 802). The switch then extracts the frame's destination MAC address and queries the local FC Name Server (operation 804). Next, the switch determines whether the FC-NS returns an N_Port or an NL_Port identifier that corresponds to an egress Ethernet port (operation 806).

If the FC-NS returns a valid result, the switch forwards the frame to the identified N_Port or NL_Port (operation 808). Otherwise, the switch floods the frame on the TRILL multicast tree as well as on all the N_Ports and NL_Ports that participate in that VLAN (operation 810). This flood/broadcast operation is similar to the broadcast process in a conventional TRILL RBridge, wherein all the physical switches in the VCS will receive and process this frame, and learn the source address corresponding to the ingress RBridge. In addition, each receiving switch floods the frame to its local ports that participate in the frame's VLAN (operation 812). Note that the above operations are based on the presumption that there is a one-to-one mapping between a switch's TRILL identifier (or nickname) and its FC switch domain ID. There is also a one-to-one mapping between a physical Ethernet port on a switch and the corresponding logical FC port.

End-to-End Frame Delivery

Figure 9:
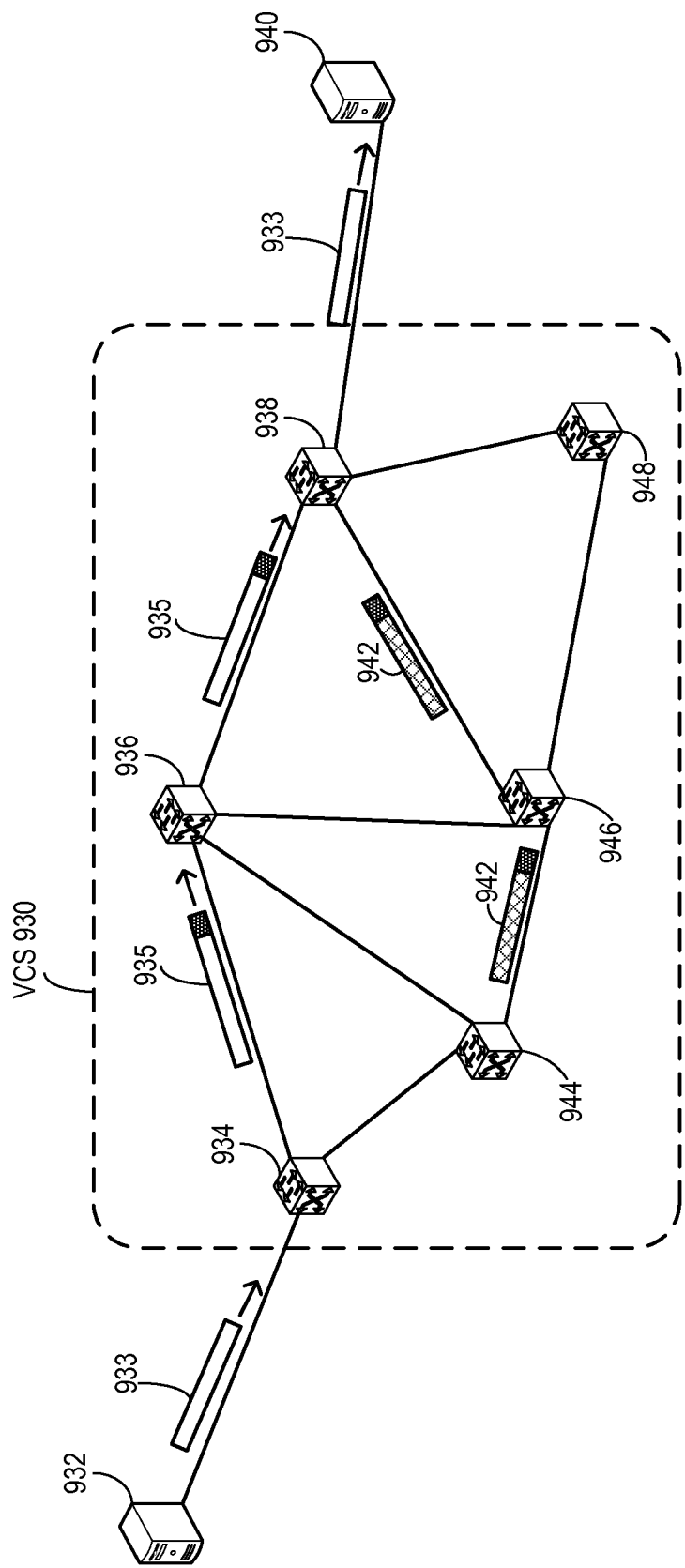
FIG. 9 illustrates how data frames and control frames are transported through a VCS, in accordance with one embodiment of the present invention.

FIG. 9 illustrates how data frames and control frames are transported in a VCS, in accordance with an embodiment of the present invention.

In this example, a VCS 930 includes member switches 934, 936, 938, 944, 946, and 948. An end host 932 is communicating with an end host 940. Switch 934 is the ingress VCS member switch corresponding to host 932, and switch 938 is the egress VCS member switch corresponding to host 938. During operation, host 932 sends an Ethernet frame 933 to host 940. Ethernet frame 933 is first encountered by ingress switch 934. Upon receiving frame 933, switch 934 first extracts frame 933's destination MAC address. Switch 934 then performs a MAC address lookup using the Ethernet name service, which provides the egress switch identifier (i.e., the RBridge identifier of egress switch 938). Based on the egress switch identifier, the logical FC switch in switch 934 performs a routing table lookup to determine the next-hop switch, which is switch 936, and the corresponding output port for forwarding frame 933. The egress switch identifier is then used to generate a TRILL header (which specifies the destination switch's RBridge identifier), and the next-hop switch information is used to generate an outer Ethernet header. Subsequently, switch 934 encapsulates frame 933 with the proper TRILL header and outer Ethernet header, and sends the encapsulated frame 935 to switch 936. Based on the destination RBridge identifier in the TRILL header of frame 935, switch 936 performs a routing table lookup and determines the next hop. Based on the next-hop information, switch 936 updates frame 935's outer Ethernet header and forwards frame 935 to egress switch 938.

Upon receiving frame 935, switch 938 determines that it is the destination RBridge based on frame 935's TRILL header. Correspondingly, switch 938 strips frame 935 of its outer Ethernet header and TRILL header, and inspects the destination MAC address of its inner Ethernet header. Switch 938 then performs a MAC address lookup and determines the correct output port leading to host 940. Subsequently, the original Ethernet frame 933 is transmitted to host 940.

As described above, the logical FC switches within the physical VCS member switches may send control frames to one another (for example, to update the VCS global configuration database or to notify other switches of the learned MAC addresses). In one embodiment, such control frames can be FC control frames encapsulated in a TRILL header and an outer Ethernet header. For example, if the logical FC switch in switch 944 is in communication with the logical FC switch in switch 938, switch 944 can sends a TRILL-encapsulated FC control frame 942 to switch 946. Switch 946 can forward frame 942 just like a regular data frame, since switch 946 is not concerned with the payload in frame 942.

Automatic Port Profile Management

Today's server virtualization infrastructure (e.g. a Hypervisor, also called virtual machine monitor) associates a server side (e.g. Hypervisor or adapter) Virtual Ethernet Bridge (VEB) port profile to each Ethernet MAC address used by a virtual machine (VM) to access the network through a VEB port. Examples of the VEB's port profile attributes includes: the types of frames allowed on the port (e.g. all frames, only frames tagged with certain VLAN values, or untagged frames), the VLAN identifiers that are allowed to be used, and rate limiting attributes (e.g. port or access-control based rate limits). In today's server virtualization infrastructure, if the VM migrates from one physical server to another, the VEB's port profile migrates with it. In other words, today's server virtualization infrastructure provides automated port profile migration of the server's VEB port(s) that are associated with a VM.

However, in existing technologies, there remains a gap between the access and Quality of Service (QoS) controls supported in external layer 2 switches and server virtualization infrastructure. That is, external layer 2 switches have more advanced controls compared to server VEB implementations. Although server virtualization infrastructure is continually adding these controls, this gap is expected to remain. Some environments prefer the more advanced controls provided by external network switches. An example of such an environment is a multi-tier data center that has several types of applications, each with differing advanced network controls, running over the same layer-2 network. In this type of environment the network administrator often prefers the use of advanced access controls available in external switches.

Today's layer-2 networks do not provide a mechanism for automatically migrating switch access and traffic controls associated with an end-point device (e.g., a VM), when that device migrates from one switch to another. The migration may be physical, such as an Operating System image (application, middleware, Operating System and associated state) that is running on one physical system and is migrated to another system. The migration may be also be virtual, such as an Operating System image (OS image) that is running over a Hypervisor on one system and is migrated to run over a Hypervisor on another system.

Embodiments of the present invention provides a mechanism for automatically migrating port profiles resident in a switch and associated with an OS image to a port on a second switch, when that OS image migrates from one physical end-host system to another end-host system, which is attached to the second switch.

Figure 10:
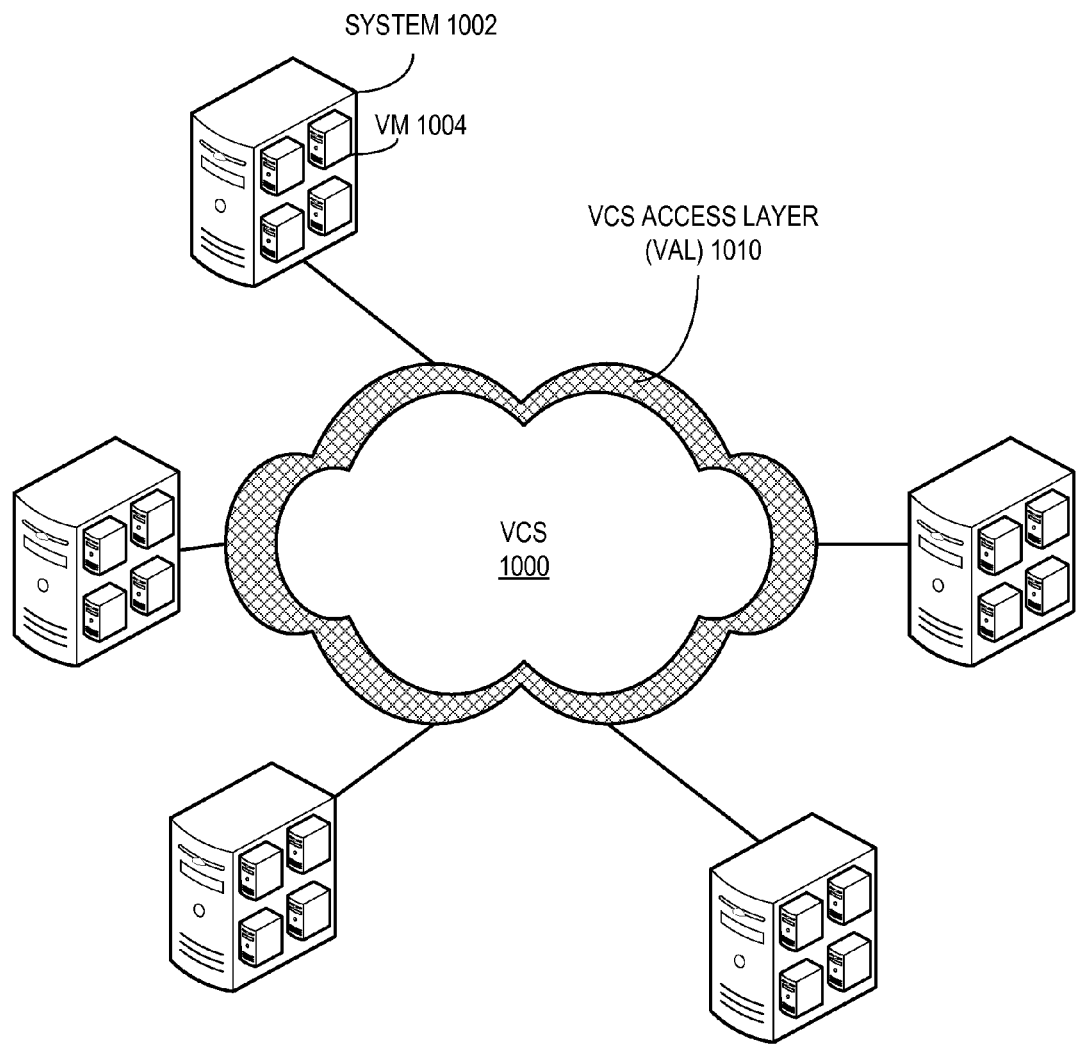
FIG. 10 illustrates a logical VCS access layer (VAL) which includes an automatic port profile manager, in accordance with one embodiment of the present invention.

FIG. 10 illustrates a logical VCS access layer (VAL) which includes an automatic port profile manager, in accordance with one embodiment of the present invention. In this example, a VCS 1000 is coupled with a number of physical server systems, such as system 1002. Each physical server system runs a number of virtual machines (VMs, also called virtual servers). For example, system 1002 includes four VMs, one of which is VM 1004. A VM may be dedicated to a certain application (e.g., instant messaging services, directory services, data base applications, etc.) and may have its own requirement on the network. A VM running mission-critical applications may require a separate VLAN within VCS 1000 and may have more strict QoS requirement (such as guaranteed port bandwidth, low latency, and guaranteed packet delivery). A VM running non-critical applications may have much lower requirements.

The switches within VCS 100 which are coupled externally to the physical end-host systems form a logical VCS access layer (VAL) 1010. The automatic migration of port profiles (AMPP) is implemented in VAL 1010. During operation, various port profiles, which are often tailored to different requirements of the VMs, are created and distributed to all the member switches in VCS 1000. As described in detail below, when the packets generated by a VM are detected by an ingress member switch of VCS 1000, the VM's source MAC address is recognized and used to identify the corresponding port profile, which is then applied to the appropriate ingress switch port. When a VM moves from one physical server to another, the MAC-address detection mechanism can quickly identify the new physical switch port to which the VM is coupled to, and apply the same port profile to the new port.

Figure 11:
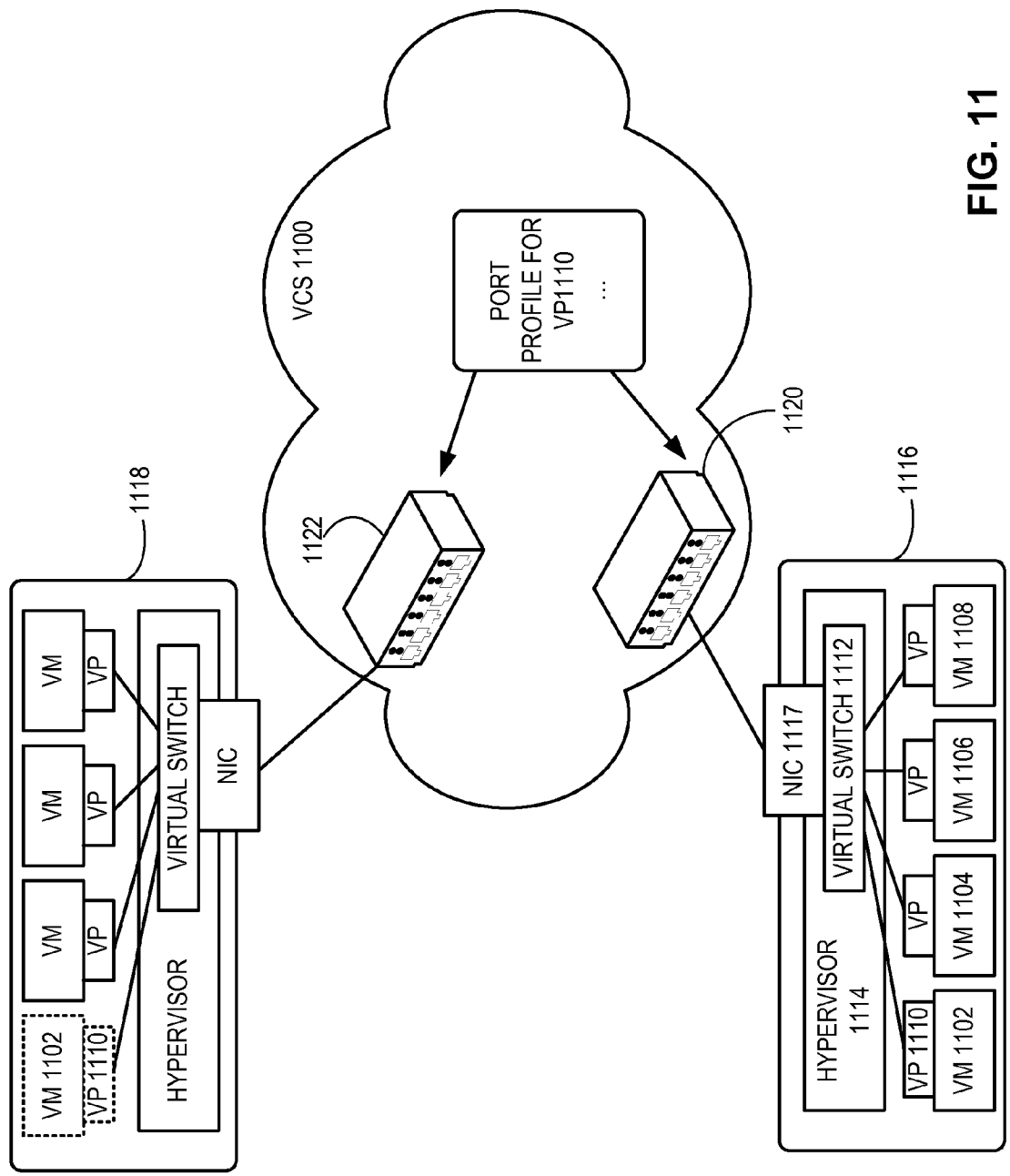
FIG. 11 illustrates an example of the operation of automatic migration of port profiles (AMPP), in accordance with one embodiment of the present invention

FIG. 11 illustrates an example of the operation of AMPP, in accordance with one embodiment of the present invention. In this example, a VCS 1100 includes two switches 1120 and 1122, which are coupled to two physical servers, 1116 and 1118, respectively. Physical server 1116 hosts four VMs, 1102, 1104, 1106, and 1008. Each VM has a virtual port (VP, or virtual network interface card, VNIC). For example, VM 1102 has a VP 1110. A respective VP is assigned a virtual MAC address. The four VPs are logically coupled to a virtual switch 1112 which is provided by a hypervisor 1114. Virtual switch 1112 is responsible for dispatching outgoing and incoming traffic through a physical NIC 1117. Note that an Ethernet frame generated by a respective VM has the virtual MAC of the corresponding VP as its source address. Logically, virtual switch 1112 functions as an aggregation point that provides a link to the ingress member switch in VCS 1100. Physical server 1118 has a similar architecture. During operation, a VM can migrate from one physical server to another (e.g., "VMotion" function provided by VMware). This migration can be event-driven or pre-scheduled. Such migration is often used to cope with changing dynamics in a number of parameters, such as server load, power consumption, resource utilization, etc.

During operation, one or more port profiles can be created to specify a number of requirements/restrictions/limitations that should be enforced at a VCS switch port corresponding to one or more VMs. For example, a port profile for VM 1102 (which can be identified by the virtual MAC address of VP 1110) can be created and distributed to every member switch of VCS 1100. When VM 1102 sends its first Ethernet frame to the network, switch 1120 would learn this source MAC address. Upon learning VP 1110's MAC address, switch 1120 then searches its port profile database and identifies the matching port profile. Subsequently, the identified port profile is applied to the port on switch 1120 which is coupled to system 1116. In addition, the same port profile is applied to the port where the matching MAC address is the destination MAC address of a frame. This way, the same network parameters are enforced at both ingress and egress ports of the VCS. Note that the port profile might include "soft" parameters. In other words, the requirements and limitations in the port profile may be specific to certain MAC addresses, and may not be "hard" limitations on the physical parameters of the switch port, since traffic from/to multiple VMs is handled by the same physical switch port.

In one embodiment, VCS 1100 provides a mechanism that distributes all the port profiles and the port-profile-to-MAC mapping information to all the member switches. The port profiles can be created using a command line interface (CLI) or other network management software. In addition, upon migration of a VM (such as a VMware VMotion), the target switch port in the VCS can automatically activate the correct port profile configuration.

Figure 12A:
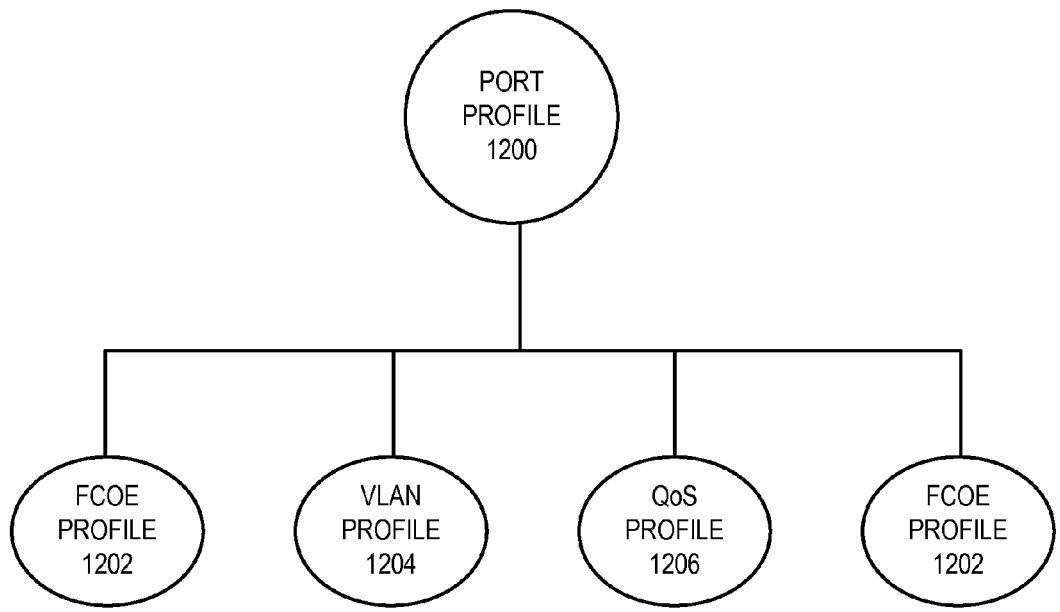
FIG. 12A illustrates exemplary port profile contents, in accordance with one embodiment of the present invention.

FIG. 12A illustrates exemplary port profile contents, in accordance with one embodiment of the present invention. As shown in FIG. 12A, a port profile can contain the entire configuration needed for a VM to gain access to a LAN or WAN, which can include: Fibre Channel over Ethernet (FCoE) configuration, VLAN configuration, QoS related configuration, and security related configuration (such as access control lists, ACLs). The list above is by no means complete or exhaustive. Furthermore, it is not necessary that a port profile contains every type of configuration information.

In one embodiment, a port profile can be capable of operating as a self contained configuration container. In other words, if a port profile is applied to a new switch without any additional configuration, the port profile should be sufficient to set the switch's global and local (interface level) configuration and allow the switch to start carrying traffic.

A VLAN configuration profile within a port profile can define:
 a VLAN membership which includes tagged VLANs and an untagged VLAN; and
 ingress/egress VLAN filtering rules based on the VLAN membership.

A QoS configuration profile within a port profile can define:
 mapping from an incoming frame's 802.1p priority to internal queue priority; (if the port is in QoS untrusted mode, all incoming frame's priorities would be mapped to the default best-effort priority)
 mapping from an incoming frame's priority to outgoing priority;
 scheduling profile, such as weighted Round-Robin or strict-priority based queuing;
 mapping of an incoming frame's priority to strict-priority based or weighted Round-Robin traffic classes;
 flow control mechanisms on a strict-priority based or weight Round-Robin traffic class; and
 limitations on multicast datarate.

An FCoE configuration profile within a port profile defines the attributes needed for the port to support FCoE, which can include:
 FCoE VLAN;
 FCMAP;
 FCoE Priority; and
 virtual Fabric ID.

A security configuration profile within a port profile defines the security rules needed for the server port. However, the security rules can be different at different ports, so some of the locally configured ACLs can be allowed to override conflicting rules from a port profile. A typical security profile can contain the following attributes:
 Enable 802.1x with EAP TLV extensions for VM mobility; and
 MAC based standard and extended ACLs.

Figure 12B:
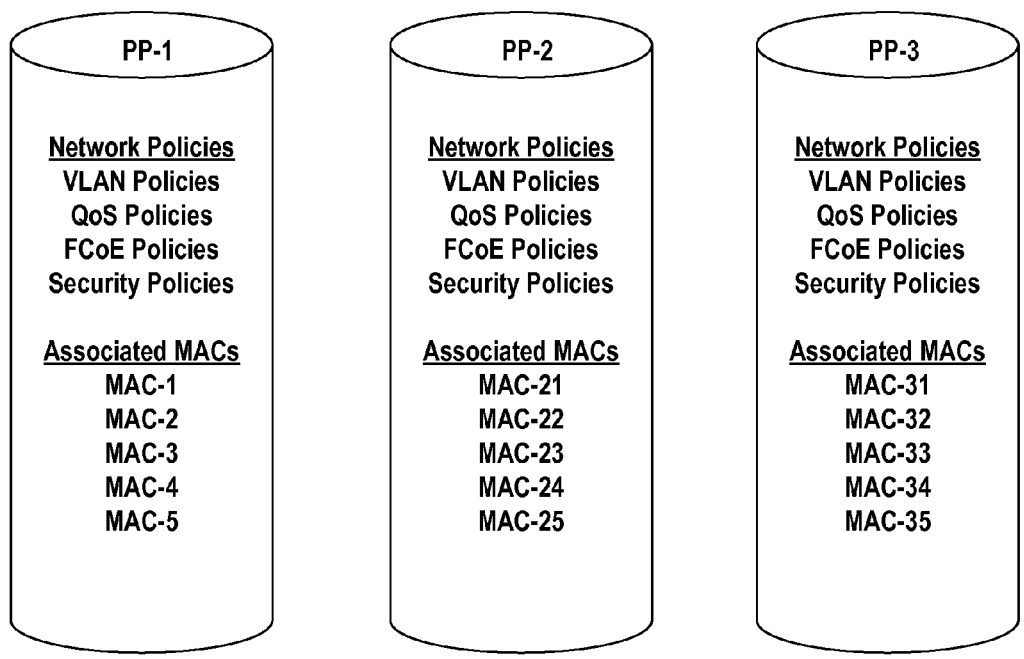
FIG. 12B illustrates three exemplary port profiles, in accordance with on embodiment of the present invention.

In one embodiment, each port profile can have one or more MAC addresses associated with it. FIG. 12B illustrates three exemplary port profiles, in accordance with on embodiment of the present invention. In this example, port profile PP-1 is associated with 5 MAC addresses. These MAC address can be virtual MAC addresses assigned to different VMs. The port-profile-to-MAC mapping information is distributed throughout the VCS. A port profile can be activated on a server port in three ways: (1) when a hypervisor binds a MAC address to a port profile ID; (2) through regular MAC learning; and (3) through a manual configuration process via a management interface.

Figures 13A, 13B:
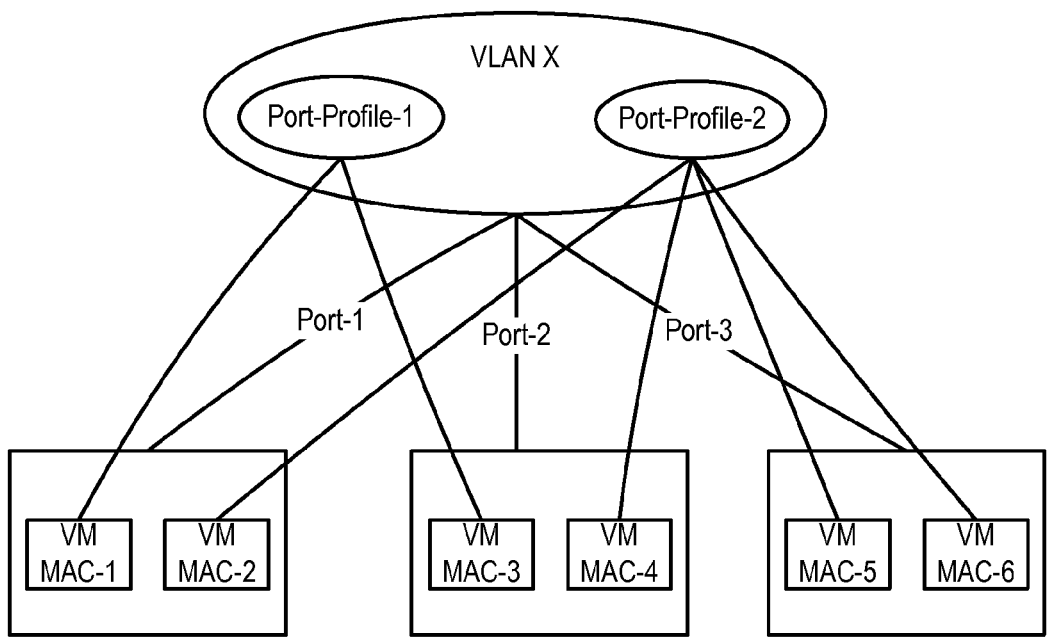
FIG. 13 illustrates how forwarding is achieved between VMs based on port profile membership, in accordance with one embodiment of the present invention.

It is possible to group a set of VMs in the network by associating them with one port profile. This group can be used to dictate forwarding between the VMs. FIG. 13 illustrates how forwarding is achieved between VMs based on port profile membership, in accordance with one embodiment of the present invention. In this example, port profile 1 has two members: MAC-1 and MAC-3. Port profile 2 has four members: MAC-2, MAC-4, MAC-5, and MAC-6. All the VMs belong to the same VLAN X. Based on the tuple <MAC, VLAN ID>, a policy group ID (GID) can be determined. All the MAC addresses mapped to the same port profile should belong to the same policy group which dictates the forwarding boundary. This configuration allows enforcing different forwarding domains within a VLAN, as illustrated in FIG. 13B. The system then ensures that both the source MAC address and destination MAC address are part of the same port profile.

Figure 14:
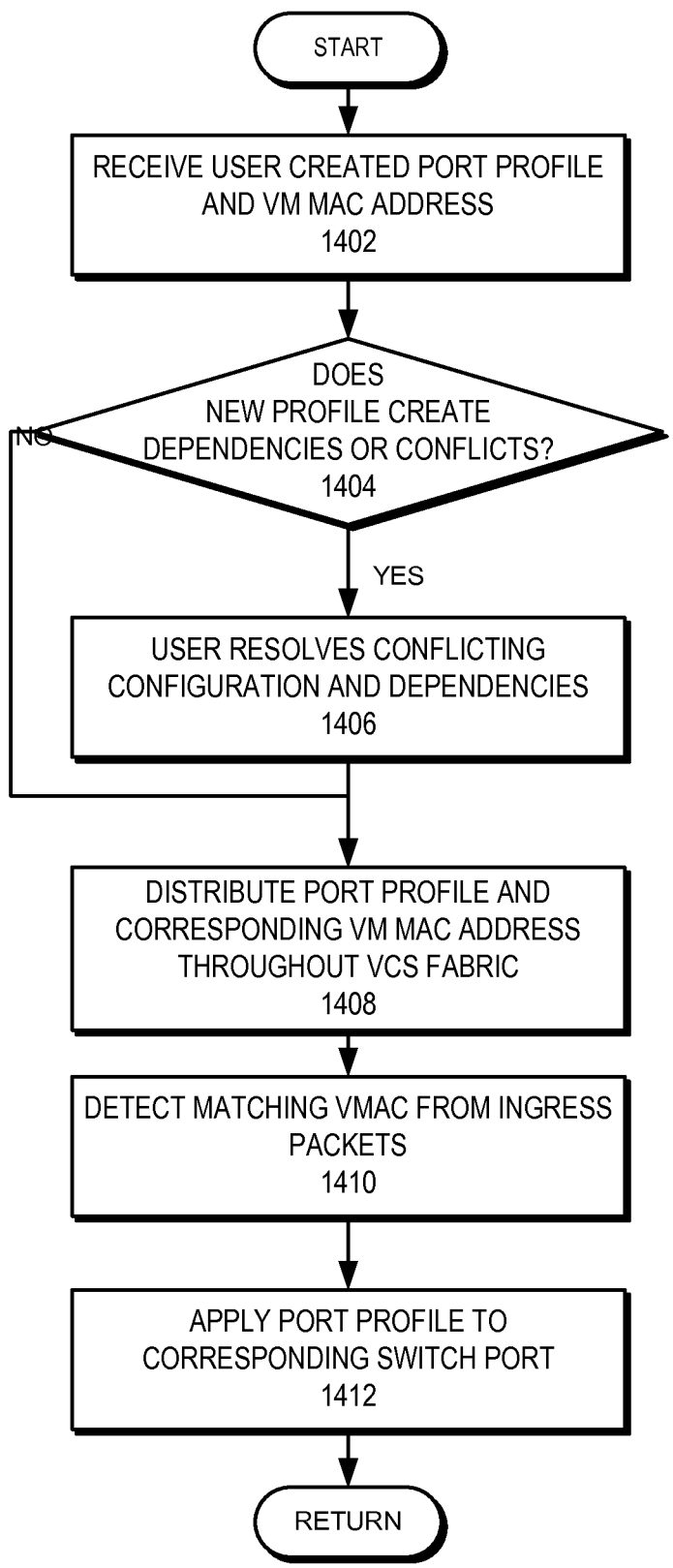
FIG. 14 presents a flowchart illustrating the process of creating and applying a port profile, in accordance with one embodiment of the present invention.

FIG. 14 presents a flowchart illustrating the process of creating and applying a port profile, in accordance with one embodiment of the present invention. During operation, the system receives a user created port profile with the corresponding VM's MAC address (operation 1402). This MAC address is then associated with the port profile and can be later used to identify the profile. The system then determines whether the new profile creates dependencies on other existing profiles or conflicts (operation 1404). If so, the system allows the user to resolve the conflicting configuration and/or dependencies (operation 1406).

Subsequently, the system distributes the port profile and the corresponding VM MAC address to every member switch throughout the VCS fabric (operation 1408). When a VM is initiated or migrated, the system then detects a matching virtual MAC address from the received ingress packets (operation 1410). Based on the learned MAC address, the system then activates the corresponding port profile on the switch port (operation 1412).

Exemplary VCS Member Switch

Figure 15:
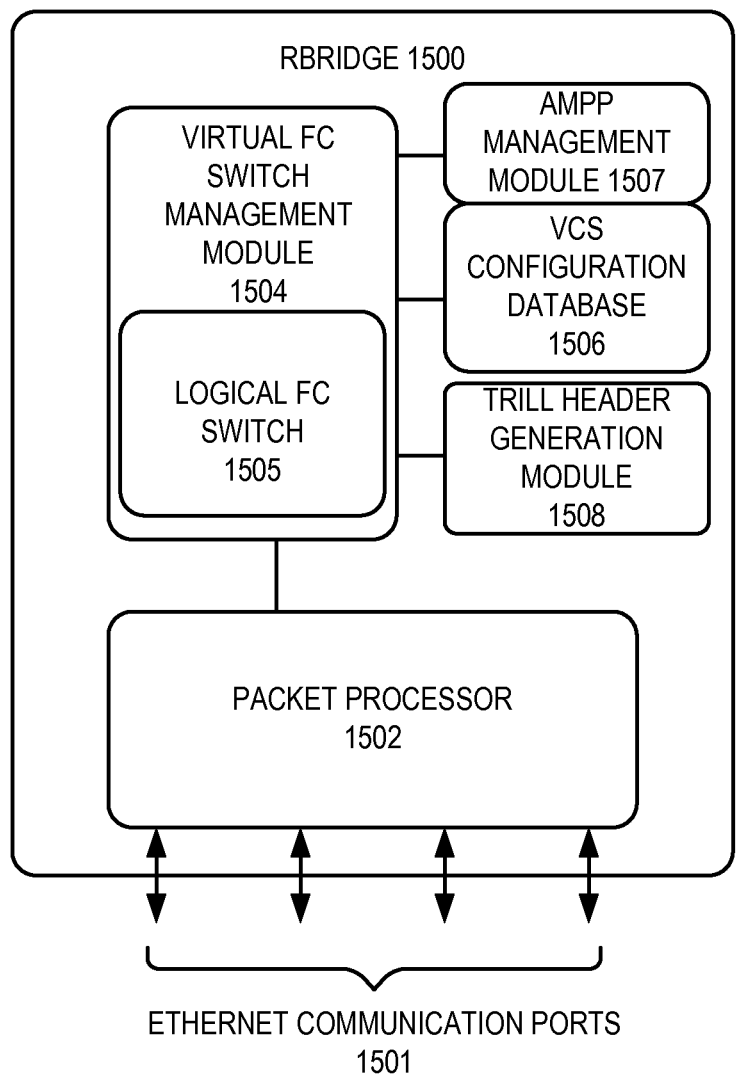
FIG. 15 illustrates an exemplary VCS member switch, in accordance with one embodiment of the present invention.

FIG. 15 illustrates an exemplary VCS member switch, in accordance with one embodiment of the present invention. In this example, the VCS member switch is a TRILL RBridge 1500 running special VCS software. RBridge 1500 includes a number of Ethernet communication ports 1501, which can transmit and receive Ethernet frames and/or TRILL encapsulated frames. Also included in RBridge 1500 is a packet processor 1502, a virtual FC switch management module 1504, a logical FC switch 1505, a VCS configuration database 1506, an AMPP management module 1507, and a TRILL header generation module 1508.

During operation, packet processor 1502 extracts the source and destination MAC addresses of incoming frames, and attaches proper Ethernet or TRILL headers to outgoing frames. Virtual FC switch management module 1504 maintains the state of logical FC switch 1505, which is used to join other VCS switches using the FC switch fabric protocols. VCS configuration database 1506 maintains the configuration state of every switch within the VCS. TRILL header generation module 1508 is responsible for generating property TRILL headers for frames that are to be transmitted to other VCS member switches.

Upon learning a new MAC address from a VM, AMPP management module 1507 identifies the port profile corresponding to the learned MAC, and applies the identified port profile. This dynamic port profile application process can respond to VM migration within a very short period of time, thereby facilitating automatic port configuration in a virtual computing environment.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   a storage device storing:
      a port profile data structure specifying a set of port configuration corresponding to a plurality of media access control (MAC) addresses; and
      a second data structure mapping a respective MAC address of the plurality of MAC addresses and a corresponding virtual local area network (VLAN) identifier to a same policy group identifier; and
   a control module configured to:
      determine that:
         a frame's source MAC address is associated with the port profile data structure; and
         the frames source MAC address is in the plurality of MAC addresses mapped to the policy group identifier; and
      in response to the determination, apply the port profile data structure to an ingress switch port of the frame, wherein applying the port profile data structure sets the port configuration specified in the port profile to the ingress switch port.

2. The switch of claim 1, further comprising a fabric switch management module configured to operate the switch as a member switch of a fabric switch, wherein the fabric switch comprises one or more physical switches;

wherein the storage device stores the port profile data structure in response to the switch being a member switch of the fabric switch.

3. The switch of claim 1, wherein the control module is further configured to, in response to the determination, apply the port profile data structure to an egress switch port of the frame, wherein applying the port profile data structure sets the port configuration specified in the port profile to the egress switch port.

4. The switch of claim 1, wherein the frame's source MAC address is a MAC address of a virtual machine.

5. The switch of claim 1, wherein the set of port configuration in the port profile data structure includes one or more of:
   quality of service (QoS) configuration;
   Fibre Channel over Ethernet (FCoE) configuration;
   virtual LAN (VLAN) configuration; and
   security related configuration.

6. The switch of claim 1, wherein one or more of the port configuration applied to the ingress switch port is specific to the frame's source MAC address.

7. The switch of claim 1, wherein the port profile data structure is applied to the ingress switch port within a predetermined time period after the frame is received.

8. A switching system, comprising:
   one or more member switches;
   a storage device residing on a respective member switch of the switching system and configured to store:
      a port profile data structure specifying a set of port configuration corresponding to a plurality of media access control (MAC) addresses;
      a second data structure mapping a respective MAC address of the plurality of MAC addresses and a corresponding virtual local area network (VLAN) identifier to a same policy group identifier; and
   a control module residing on a respective member switch of the switching system and configured to:
      determine that:
         a frame's source MAC address is associated with the port profile data structure; and
         the frame's source MAC address is in the plurality of MAC addresses mapped to the policy group identifier; and
      in response to the determination, apply the port profile data structure to an ingress switch port of the frame, wherein applying the port profile data structure sets the port configuration specified in the port profile to the ingress switch port.

9. The switching system of claim 8, wherein the switching system is a fabric switch;
   wherein the storage device in a respective member switch stores the port profile data structure in response to the member switch being a member of the fabric switch.

10. The switching system of claim 8, wherein the control module is further configured to, in response to the determination, apply the port profile data structure to an egress switch port of the frame, wherein applying the port profile data structure sets the port configuration specified in the port profile to the egress switch port.

11. The switching system of claim 8, wherein the frame's source MAC address is a MAC address of a virtual machine.

12. The switching system of claim 8, wherein the set of port configuration in the port profile data structure includes one or more of:
   quality of service (QoS) configuration;
   Fibre Channel over Ethernet (FCoE) configuration;
   virtual LAN (VLAN) configuration; and
   security related configuration.

13. The switching system of claim 8, wherein one or more of the port configuration applied to the ingress switch port is specific to the frame's source MAC address.

14. The switching system of claim 8, wherein the port profile data structure is applied to the ingress switch port within a predetermined time period after the frame is received.

15. A method, comprising:
   storing in a storage device a port profile data structure specifying a set of port configuration corresponding to a plurality of media access control (MAC) addresses;
   storing in the storage device a second data structure mapping a respective MAC address of the plurality of MAC addresses and a corresponding virtual local area network (VLAN) identifier to a same policy group identifier;
   determining that a frame's source media access control (MAC) address is associated with the port profile data structure;
   determining that the frame's source MAC address is in the plurality of MAC addresses mapped to the policy group identifier; and
   in response to the determination, applying the port profile data structure to an ingress switch port of the frame, wherein applying the port profile data structure sets the port configuration specified in the port profile to the ingress switch port.

16. The method of claim 15, further comprising, in response to the determination, applying the port profile data structure to an egress switch port of the frame, wherein applying the port profile data structure sets the port configuration specified in the port profile to the egress switch port.

17. The method of claim 15, wherein the frame's source MAC address is a MAC address of a virtual machine.

18. The method of claim 15, wherein the set of port configuration in the port profile data structure includes one or more of:
   quality of service (QoS) configuration;
   Fibre Channel over Ethernet (FCoE) configuration;
   virtual LAN (VLAN) configuration;
   security related configuration.

19. The method of claim 15, wherein the port profile data structure is applied to the ingress switch port within a predetermined time period after the frame is received.

20. A switching means, comprising:
   a storage device means for storing:
      a port profile data structure means specifying a set of port configuration corresponding to a plurality of media access control (MAC) addresses; and
      a second data structure means mapping a respective MAC address of the plurality of MAC addresses and a corresponding virtual local area network (VLAN) identifier to a same policy group identifier; and
   a control means for:
      determining that:
         a frame's source MAC address is associated with the port profile data structure; and
         the frame's source MAC address is in the plurality of MAC addresses mapped to the policy group identifier; and
      in response to the determination, applying the port profile data structure to an ingress switch port means of the frame, wherein applying the port profile data structure sets the port configuration specified in the port profile to the ingress switch port means.

* * * * *